(12) United States Patent
Morimoto et al.

(10) Patent No.: US 7,620,686 B2
(45) Date of Patent: Nov. 17, 2009

(54) CONTROL METHOD FOR NETWORK SYSTEM

(75) Inventors: Kenjiro Morimoto, Tokyo (JP); Kouichi Toya, Tokyo (JP)

(73) Assignee: Sega Corporation, Tokyo (JP)

( * ) Notice: Subject to any disclaimer, the term of this patent is extended or adjusted under 35 U.S.C. 154(b) by 1595 days.

(21) Appl. No.: 10/635,643

(22) Filed: Aug. 7, 2003

(65) Prior Publication Data

US 2004/0119733 A1      Jun. 24, 2004

(30) Foreign Application Priority Data

Aug. 8, 2002     (JP)     ............... 2002-231641

(51) Int. Cl.
    *G06F 15/16*     (2006.01)
(52) U.S. Cl. .................. 709/205; 709/204; 709/206
(58) Field of Classification Search ............. 709/204, 709/205, 206
    See application file for complete search history.

(56) References Cited

U.S. PATENT DOCUMENTS 6,298,374 B1 *  10/2001  Sasaki et al. ................ 709/204

2002/0046050 A1 *  4/2002  Nakazawa et al. ............. 705/1

FOREIGN PATENT DOCUMENTS

| JP | 11-250278 | 9/1999 |
|---|---|---|
| JP | 2001-175886 | 6/2001 |

OTHER PUBLICATIONS

Qbist Inc., "Phantasy Star Online Ultimate", Softbank Publishing Corp., Feb. 12, 2002, first edition, p. 301.
Naru Uchida, "Phantasy Star Online", LOGiN, Enterbrain Inc., Feb. 1, 2002, vol. 21, No. 2, p. 29.

* cited by examiner

*Primary Examiner*—Vivek Srivastava
*Assistant Examiner*—Adnan Mirza
(74) *Attorney, Agent, or Firm*—Dickstein Shapiro LLP

(57) ABSTRACT

A plurality of information processing systems 10 are connected to a network 90. One of the information processing systems 10 photographs a part of a virtual space shared by the plurality of information processing systems 10. Information of having photographed is transmitted to the other information processing systems 10. The other information processing systems 10 which received the information of having photographed make a photographing effect, e.g., flashlight, shutter sound or others. The method for controlling a network system enables photographing in a virtual space, such as a game space.

3 Claims, 25 Drawing Sheets

(C) XXXX CO. LTD. 2002

(C) XXXX CO. LTD. 2002

CONTROL METHOD FOR NETWORK SYSTEM

BACKGROUND OF THE INVENTION

The present invention relates to a method for controlling a network system interconnecting a plurality of information processing systems.

The recent development of the communication techniques has allowed domestic game apparatuses, personal computers, etc. in houses to be interconnected in common networks, or information processing apparatuses installed in stores, such as game centers, game cafes, etc. to be interconnected by exclusive circuits, as of optical fibers, etc. in networks.

Using these networks, a plurality of participants can chat with each other real time, or a plurality of participants can play together common games, e.g., an unknown world adventure game.

A game in which a plurality of game players take part in has a virtual space called a lobby or others for the game players to collect the game participants or to exchange information with one another.

In such adventure game, etc. played by a plurality of game players, if pictures as memories can be taken in the games, it will augment the amusement of the games. The game players tend to have their own events in the game space, such as the lobby or others, among the game players to enjoy the events, and in this case as well, if pictures can be taken, it will further make the events amusing.

The respective game players can conventionally capture images in a game. However, there has been no idea that the game players take pictures of the game players in the game space.

SUMMARY OF THE INVENTION

An object of the present invention is to provide a control method for a network system in which pictures can be taken in a virtual space, such as a game space.

The control method for a network system according to one embodiment of the present invention is characterized by a control method for a network system to which a plurality of information processing systems are connected, comprising the steps of: photographing a part of a virtual space shared by the plurality of information processing systems by one of the information processing systems; transmitting information of photographing or having photographed to the other information processing systems; and executing a photographing effect when photographed.

In the above-described method for controlling a network system it is possible that the control method further comprises the step of: specifying an object for said one information processing system to photograph, the information of having photographed including information of the specified object, the information processing system alone associated with the specified object of said other information processing systems executing the photographing effect.

In the above-described method for controlling a network system it is possible that the control method further comprises the step of: specifying a character for said one information processing system to photograph, the information of photographing being transmitted to the information processing system associated with the specified character, said one information processing system photographing the character when the character takes a prescribed pose toward photographing means used by said one information processing system.

In the above-described method for controlling a network system it is possible that the control method further comprises the step of: specifying a character for said one information processing system to photograph, the information of photographing being transmitted to the information processing system associated with the specified object, said one information processing system photographing said object after receiving from the information processing system associated with the object information of permitting photographing.

In the above-described method for controlling a network system it is possible that the control method further comprises the steps of: counting times of the respective information processing systems being photographed, and executing events which are different depending on times of the respective information processing systems being photographed.

The method for controlling a network system according to one embodiment of the present invention is characterized by a control method for a network system to which a plurality of information processing systems are connected, comprising the steps of: photographing by one information processing system a part of a virtual space shared by said plurality of information processing systems, and executing a photographing effect at least one of said plurality of information processing systems, the photographing effect spontaneously visibly lighting the part of the virtual space.

The method for controlling a network system according to one embodiment of the present invention is characterized by a control method for a network system to which a plurality of information processing systems are connected, comprising the steps of: photographing by one information processing system a part of a virtual space shared by said plurality of information processing systems, and producing an image photographed by said one information processing system, an image which is invisible in the virtual space viewed by said one information processing system being included in the photographed image.

In the above-described method for controlling a network system it is possible that said invisible image is a copyright indication.

The method for controlling a network system according to one embodiment of the present invention is characterized by a control method for a network system to which a plurality of information processing systems are connected, comprising the steps of: transmitting, from one information processing system to the other information processing systems, photographing means for photographing a part of a virtual space shared by said plurality of information processing system; and transmitting, from the other information processing systems to said one information processing system, the photographing means and photographing information after the other information processing systems have photographed with said photographing means.

In the above-described method for controlling a network system it is possible that until a prescribed period of time passes from the previous photographing operation, photographing is impossible, or the information of permitting photographing is not transmitted; and a "no photographing" indication is made in the information processing system which is to photograph.

In the above-described method for controlling a network system it is possible that until a prescribed period of time passes from the receipt of the previous information of having photographed, photographing is impossible, or the information of permitting photographing is not transmitted; and a "no photographing" indication is made in the information processing system which is to photograph.

In the above-described method for controlling a network system it is possible that upon photographing, said one information processing system stores information of a photographed image.

In the above-described method for controlling a network system it is possible that upon photographing, said one information processing system stores a condition of a photographed image.

As described above, the present invention comprises the step of photographing a part of a virtual space shared by a plurality of information processing systems by one of the information processing systems, the step of transmitting to others of the information processing systems the information of photographing or having photographed, and the step of making the effect indication when photographed, whereby photographing can be performed in a virtual space, such as a game space.

DETAILED DESCRIPTION OF THE INVENTION

An Embodiment

The network system of one embodiment of the present invention will be explained.

(The Network System)

Figure 1:
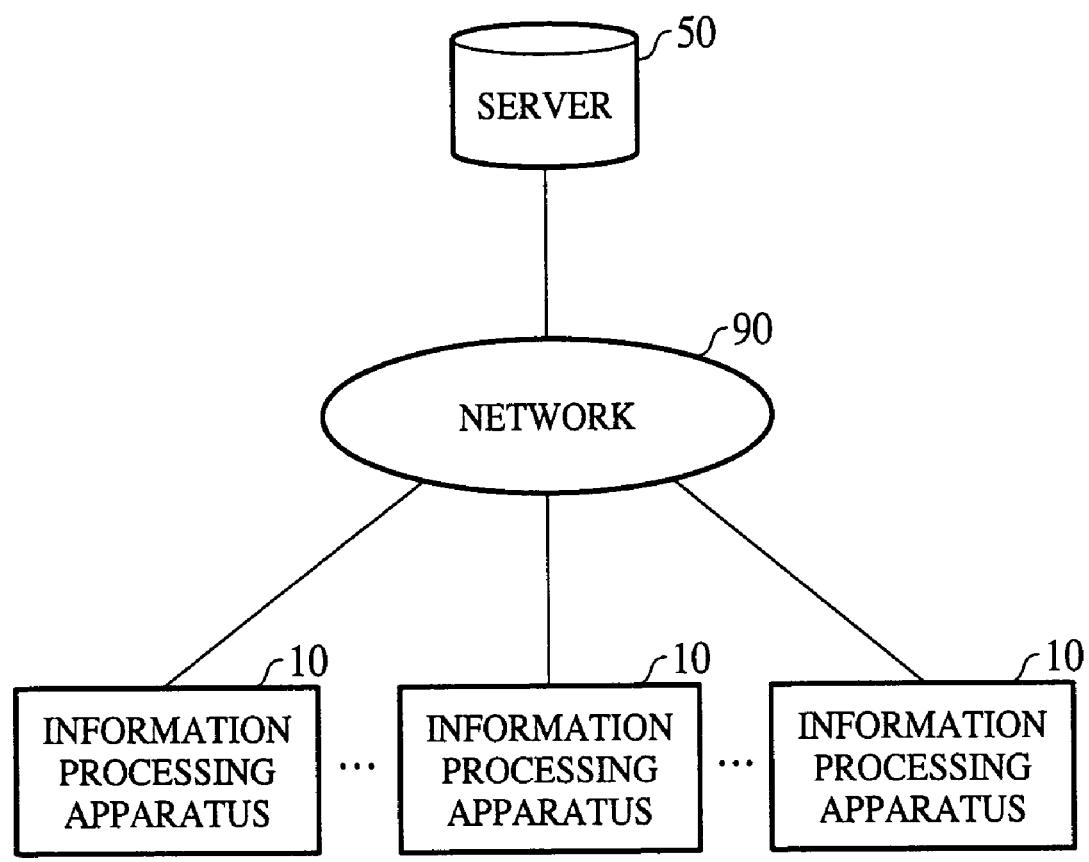
FIG. 1 is a block diagram of a constitution of the network system according to one embodiment of the present invention.

A structure of the network system of the present embodiment is shown in FIG. 1. In FIG. 1, information processing systems 10 which are the terminal systems of a plurality of clients, and a server 50 is connected to a network 90, such as an internet or others, via telephone circuits.

The information processing systems 10 are, e.g., personal computers and computer game apparatuses, and each comprise a control system having a CPU, etc.; a display, such as a CRT display, liquid crystal display or others; and input means, such as a keyboard, a mouse or others.

The server 50 is, e.g., a computer and comprises a control system having a CPU, etc.; a display, such as a CRT display, a liquid crystal display or others; and input means, such as a keyboard, a mouse or others.

(A Structure of the Information Processing System)

A structure of a game apparatus as one example of the information processing system 10 of the network system of the present embodiment will be explained with reference to FIG. 2.

The information processing systems 10 are not limited to domestic game apparatuses and can be portable terminals, such as game apparatuses, portable telephones, PHSs, PDAs, etc. The terminal apparatuses installed in game centers, game cafes, etc., electronic devices, such as personal computers, etc., in respective houses can be the information processing systems 10. Furthermore, such apparatuses may mixedly form the network.

Figure 2:
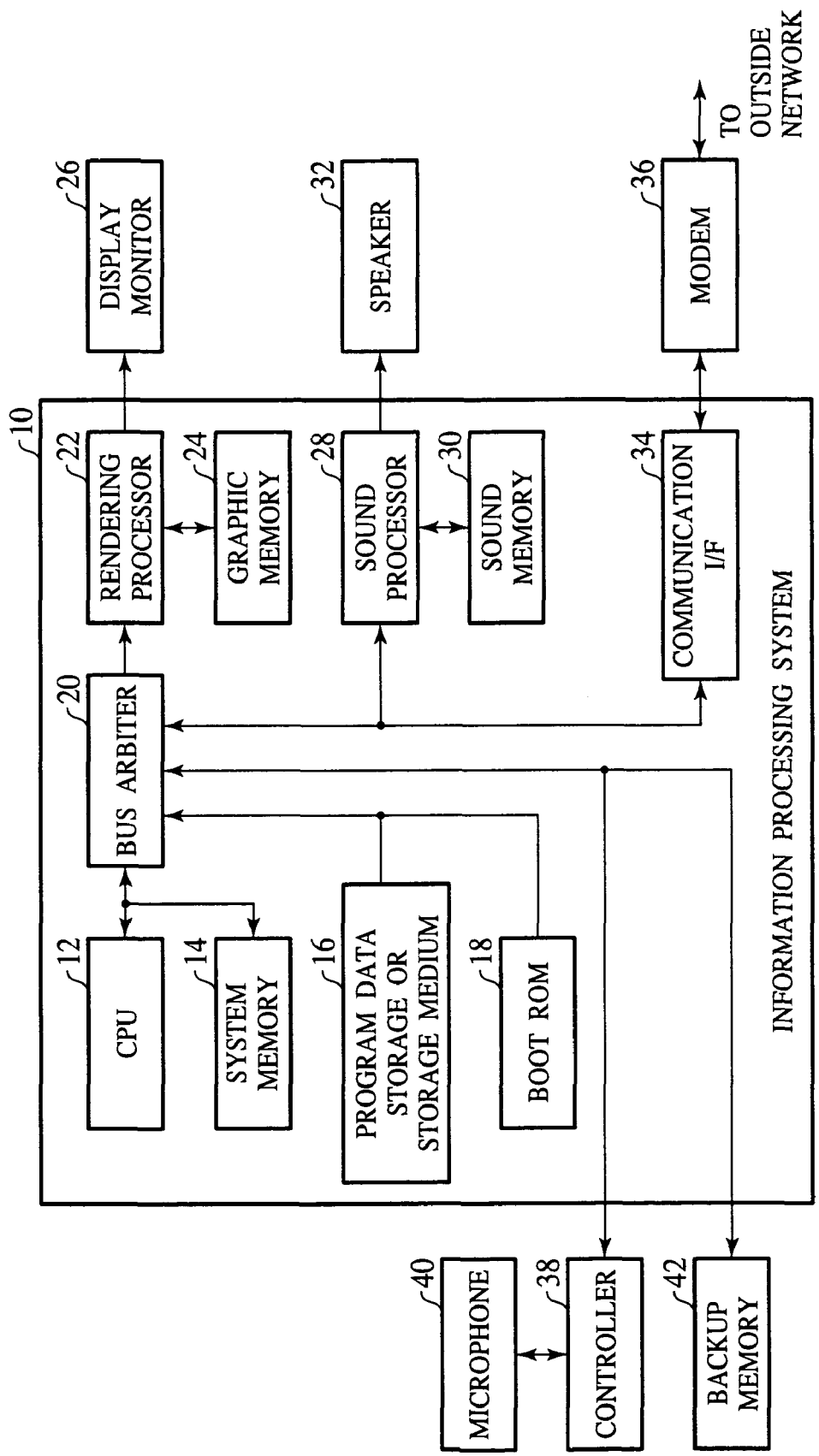
FIG. 2 is a block diagram of a constitution of a game apparatus of the network system according to the embodiment of the present invention.

As shown in FIG. 2, each information processing system 10 comprises a CPU 12 which executes the game programs, generally computes the system, computes coordinates, etc. for displaying images, and makes other functions, and a system memory (RAM) 14 which is used as a buffer memory for storing programs and data for the CPU 12 to perform the processing which are connected to a common bus line and are connected to a bus arbiter 20. The arbiter 20 controls programs and flows of data of the respective blocks of the information processing system 10 and of the outside devices connected to thereto.

A program data storing device and a storage medium 16 (including optical discs, an optical disc drive, etc. for driving CD-ROMs, game storage mediums) storing the game programs and data (including image data and music data), a BOOTROM 18 storing programs and data for actuating the information processing system 10 are connected to the arbiter 20 via a bus line.

The bus arbiter 20 is connected via the bus arbiter 20 to a lettering processor 22 which reproduces movie data read from the program data storage device or the storage medium 16 and produces images to be displayed in accordance with operations of a game player and the game progress, and to a graphic memory 24 which stores graphic data, etc. necessary for the lettering processor 22 to produce images. The image signals outputted from the lettering processor 22 are converted by a video digital analogue converter (DAC)(not shown) from digital signal to analog signals to be displayed on a display monitor 26.

A sound processor 28 for reproducing music data read from the program data storage device or the storage medium 16 and producing effective sounds corresponding to operations of a game player and the game progress, and a sound memory 30 for storing sound data, etc. necessary for the sound processor 28 to produce effective sounds and voices are connected to the bus arbiter 20. Voice signals outputted from the sound processor 28 are converted by an audio digital analogue converter (DAC) (not shown) from digital signals to analog signals to be outputted from a speaker 32.

The bus arbiter 20 is connected to a communication interface 34. The communication interface 34 is connected to an outside network, such as telephone circuits, etc. via a modem 36. The modem 36 connects the information processing system 10 to the internet via the telephone circuits, whereby the information processing system 10 can communicate with other game apparatuses, the network server, etc. The communication interface 34 and the modem 36 use the telephone circuits but may use other communication means, such as terminal adapters (TA) or rooters using telephone circuits, cable modems using cable television circuits, wireless communication means using portable telephones and PHS's, optical fiber communication means using optical fibers, etc.

A controller 38 is connected to the bus arbiter 20 to output to the information processing device 10 signals for controlling the information processing device 10 and outside devices connected to the information processing device 10. A microphone 40 for inputting voice signals is connected to the controller 38. The bus arbiter 20 may be connected to a key board (not shown) so as to make letters input by operators.

The bus arbiter 20 is connected to an outside backup memory 42 so as to store specific information, etc. of an operator who operates the information processing system 10.

When the information processing system 10 is a personal computer or others other than the game apparatus has basically the same structure as shown in FIG. 2.

(A Structure of the Server)

Figure 3:
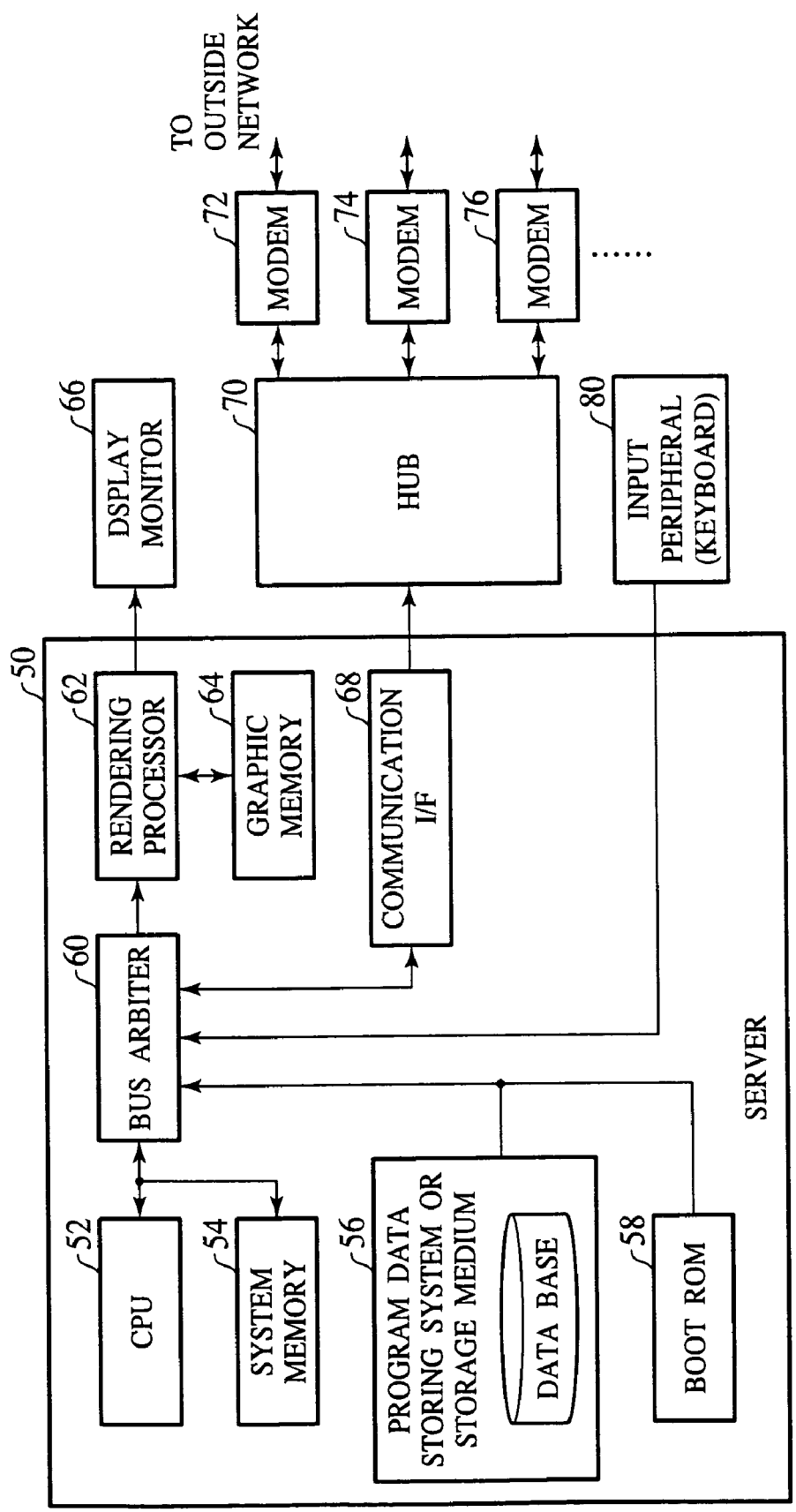
FIG. 3 is a block diagram of a constitution of the server of the network system according to the embodiment of the present invention.

The structure of one example of the server 50 of the network system of the present embodiment will be explained with reference to FIG. 3.

In the server 50, the server 50 is connected to a CPU 52 which executes programs, generally controls the system, computes coordinates for image display, etc. and a system memory 8 (RAM) 54 as a buffer memory for storing programs and data necessary for the CPU 52 to make processing are connected to the bus arbiter 60 by a common bus line. The bus arbiter 60 controls programs and flows of data of the respective blocks of the server 50 and outside devices connected to the server 50.

A program data storing device or a storage medium 56 (including optical discs and optical drives, etc. for driving CD-ROMs, etc. as game storing mediums) storing programs and data (including image data and music data), and a BOOTROM 58 storing programs and data for driving the server 50 are connected to the bus arbiter 60 via a bus line.

The server 50 is connected to a rendering processor 62 which reproduces movie data read from the program data storing device or the storage medium 56 and producing images to be displayed in accordance with operations of a game player and the game progress, and a graphic memory 64 which stores graphic data, etc. necessary for the rendering processor 62 to produce images. Image signals outputted from the rendering processor 62 are converted from digital signals to analog signals by a video digital analogue converter (DAC) (not shown) to be displayed on a display monitor 66.

A communication interface 68 is connected to bus arbiter 60. A plurality of modems 72, 74, 76, . . . are connected to the communication interface 68 via a hub 70. The communication interface 69 is connected to the outside network via thee modems 72, 74, 76, . . . An input peripheral 80, such as a keyboard, etc. are connected to the bus arbiter 60.

(Game Space)

The game space of the network system of the present embodiment will be explained with reference to FIGS. 4 to 6. The information processing system 10 here is a personal computer.

Figure 4:
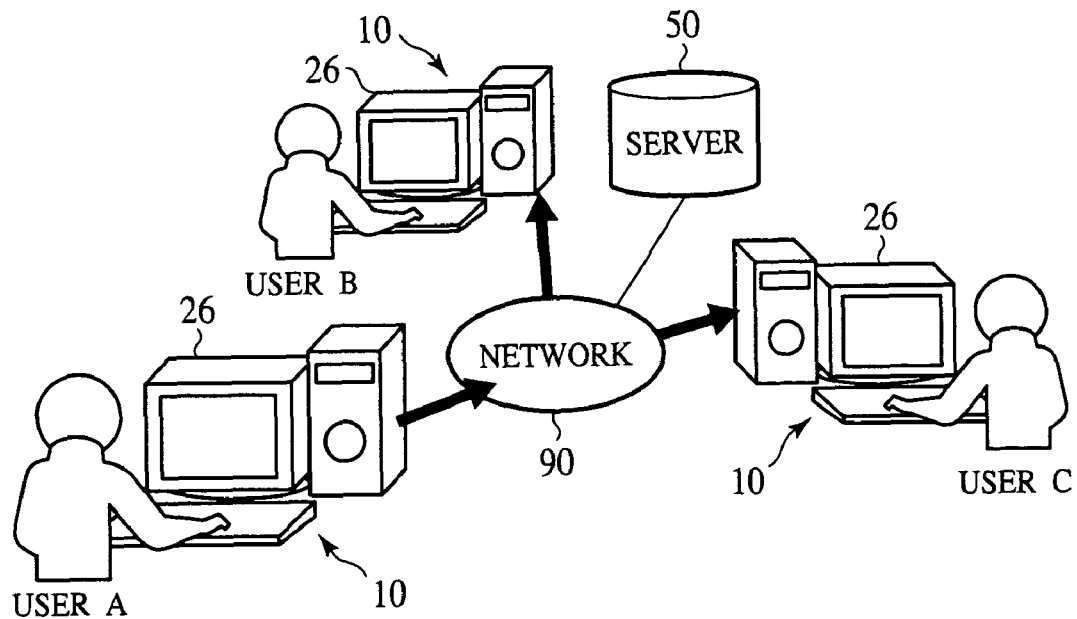
FIG. 4 is a view of one example of the network system according to the embodiment of the present invention.

As shown in FIG. 4, the information processing systems 20 used by a user A, a user B and a user C are connected to the network 90 via the respective telephone circuits or others. The network 90 is connected to the server 50.

Figure 5:
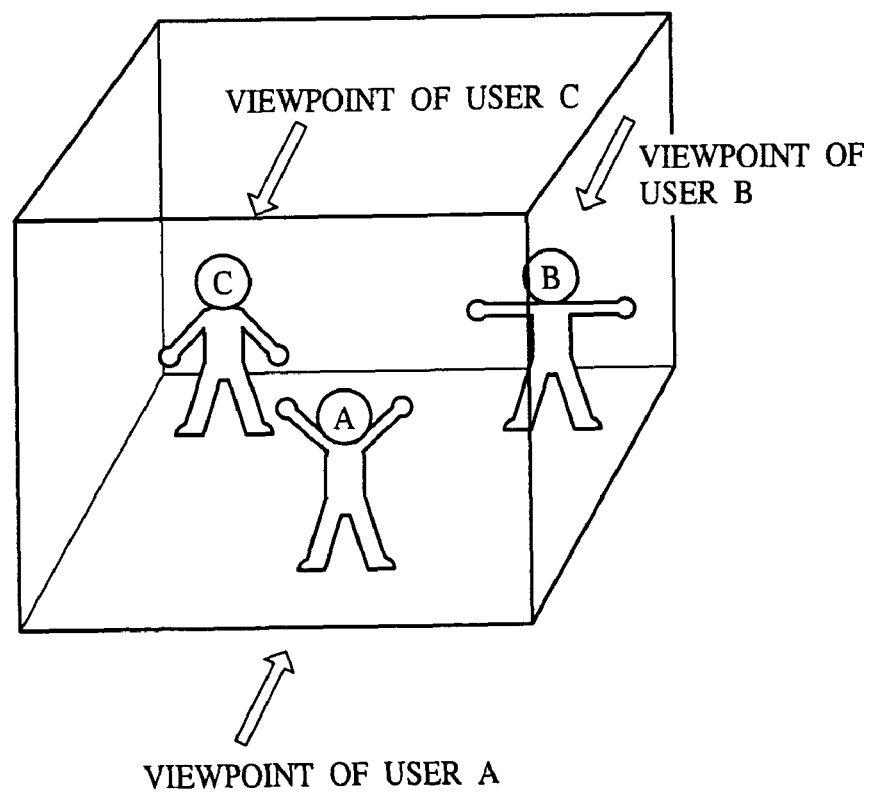
FIG. 5 is a view of the game space of the network system according to the embodiment of the present invention.

A virtual game space as shown in FIG. 5 is defined for the user A, the user B and the user C. A character A of the user A, a character B of the user B and a character C of the user C are in the game space. The character A, the character B and the character C in the game space are freely movable in accordance with operations of the respective users A, B, C, and viewpoints of the users A, B, C can be freely moved.

Figure 6A:
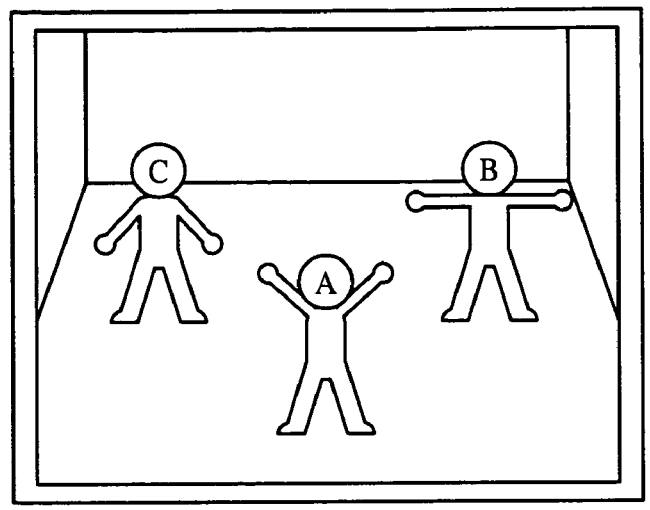
FIG. 6 is views of images of the game space of the network system according to the embodiment of the present invention.
Figure 6B:
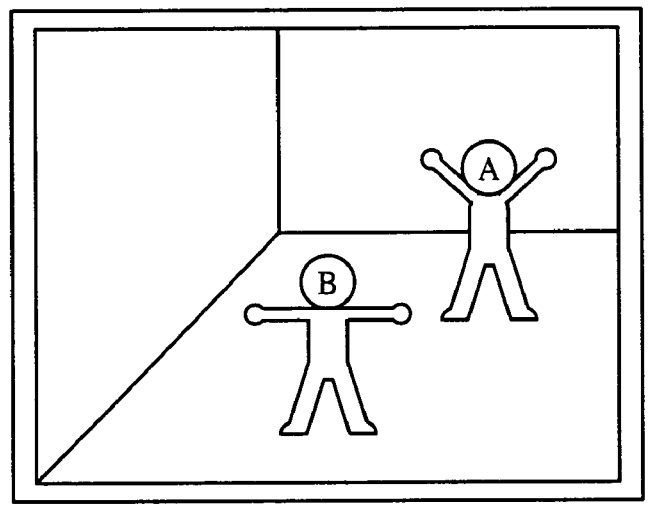

When the character A, the character B and the character C are positioned as shown in FIG. 5, and the viewpoints of the character A, the character B and the character C are directed as shown in FIG. 5, the image including the character A, the character B and the character C as shown in FIG. 6A is displayed on the display monitor 26 of the information processing terminal 10 of the user A. On the display monitor 26 of the information processing terminal 10 of the user B, the image including the character A and the character B as shown in FIG. 6B is displayed. The image including the character A and the character C as shown in FIG. 6C is displayed on the display monitor 26 of the information processing terminal 10 of the user C.

Figure 6C:
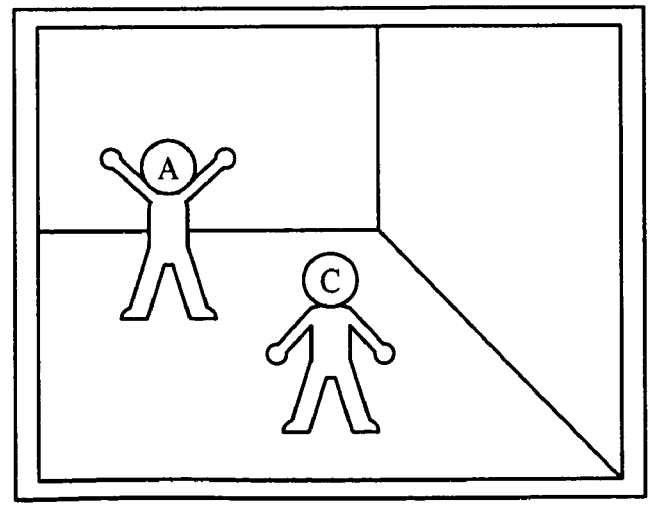

The images of FIGS. 6A, 6B and 6C respectively include the users' own characters A, B and C. However, the users' own characters may not be included in images in order to display images viewed by the characters A, B and C. In that case, the image of FIG. 6A would not include the character A, the image of FIG. 6B would not include the character B, and the image of FIG. 6C would not include the character C.

(Basic Control for Photographing)

Figure 7:
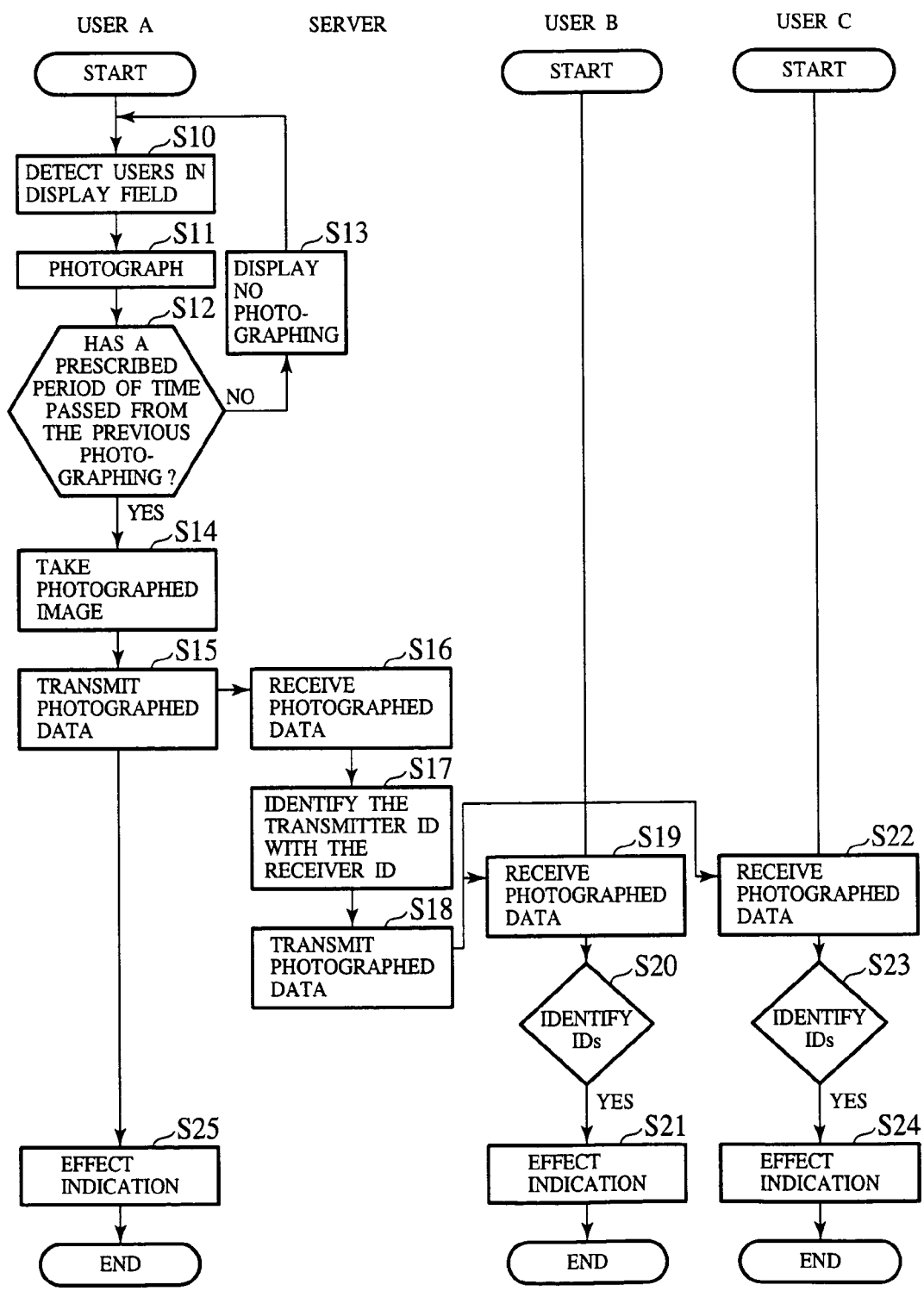
FIG. 7 is a flow chart of the basic control of photographing of the network system according to the embodiment of the present invention.
Figure 8:
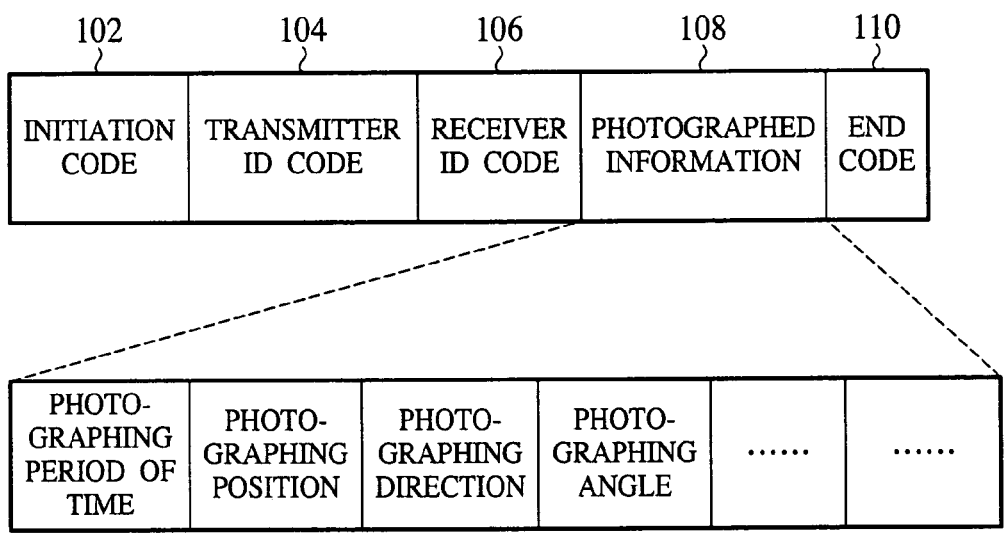
FIG. 8 is a view of the photographed data of the network system according to the embodiment of the present invention.
Figure 9:
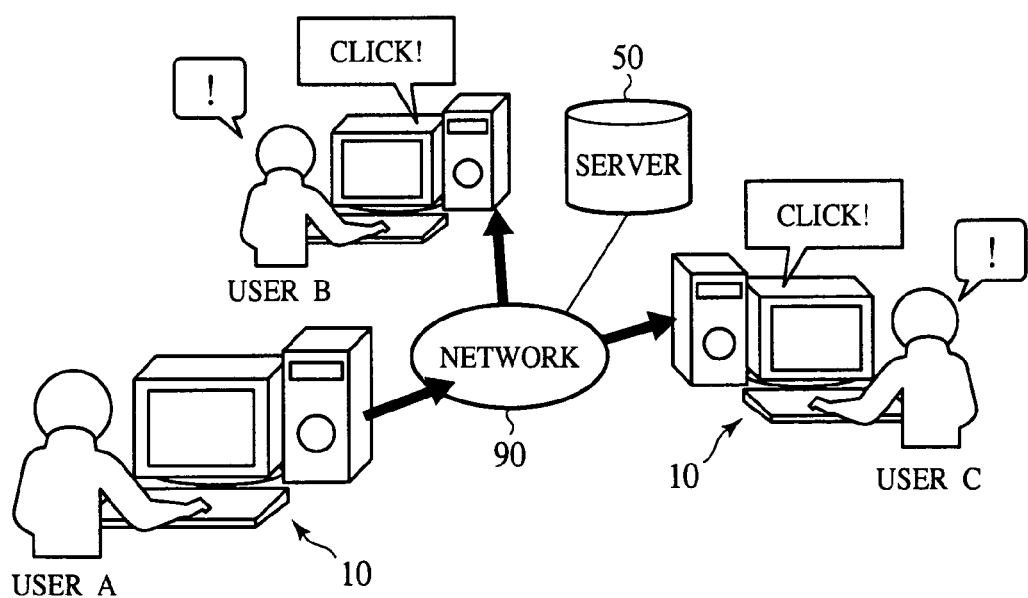
FIG. 9 is a view of the effect indication of photographing of the network system according to the embodiment of the present invention.

The basic control for photographing in the network system of the present embodiment will be explained with reference to FIGS. 7 to 9. FIG. 7 is a flow chart of the operation of the information processing system 10 when pictures are taken. FIG. 8 is a view of photographing data. FIG. 9 is a view of an effect indication of photographing.

The operation of the user A's photographing with the information processing system 10 in the game space as shown in FIGS. 6 and 7 will be explained.

Photographing here means storing in the memory a scene in the virtual space as viewed at a viewpoint set in the information processing system 10.

When such photographing is done in a game, the user operates to move his character to photograph a scene in the virtual space as viewed at the character's viewpoint in the game space. The user owns the photographed information as he does his items, etc. and, as required, he views the photographed information, or shows the other users the photographed information. The owned information can be an image itself, or photographing information for the preparation of the image which will be described later.

The information processing system 10 of the user A incessantly detects characters present in display fields depending on positions and viewpoints of the character A (Step S10). Here, when the user A operates to photograph (Step S11), it is judged whether or not a prescribed period of time has passed from the previous photographing operation (Step S12). Unless the prescribed period of time has passed, "No photographing" is indicated (Step S13), and Step S10 follows.

After the prescribed period of time has passed, photographing is permitted, because when photographing is done continuously in a short period of time, effect indications, as of flashlight or others, which will be described later continuously made, undesirably disturbing the advance of a game.

The period of time may be measured for the respective users independently of each other or may be measured commonly for the users sharing the game space.

The "no photographing" indication in the step S13 may be, e.g., the indication of simply "no photographing", "charging the flash light source" or "winding the film".

When a prescribed period of time has passed from the previous photographing, and photographing is possible, a photographed image is obtained in the game space at this time (Step S14). The photographed image, as shown in FIG. 6A, includes the character A, the character B and the character C of the user A, the user B and the user C as shown in FIG. 6A.

Then, the information processing system 10 of the user A transmits the photographing data (Step S15). The photographing data 100 prepared by the information processing system 10 of the user A includes, as shown in FIG. 8, an initiation code 102, an ID code 104 of the information processing system 10 of the transmitter, ID codes 106 of the information processing systems of receivers, photographing information 108 and an end code 110. A plurality of receivers' ID codes can be indicated in the ID code 106 of the information processing systems 10 of receivers. The photographing information 108 includes, e.g., a photographing time, a photographing position, a photographing angle, etc. The photographing information 108 can be an image itself of a photographed image.

The server 50 receives the photographing data (Sept S16). The server 50 identifies, based on the photographing data, an ID of the transmitter information processing system 10 with the IDs of the receiver information processing systems 10 (Step S17) and transmits the photographing data to the information processing systems 10 of the receivers via the network 90 (Step S18).

The information processing system 10 of the user B receives the photographing data (Step S19). The information processing system 10 which has received the photographed data identifies whether or not the receiver ID of the photographing data with its own ID (Step S20). When the former does not agree with the latter, the photographing operation ends without making the effect indication.

The effect indication indicates photographing to the respective users and is, e.g., a display of flashlight or a shuttering sound.

The information processing system 10 of the user C receives the photographing data (Step S22). The information processing system 10 which has received the photographing data identifies whether or not the receiver ID of the photographing data identifies with its own ID (Step S23), and when the former agrees with the latter, the effect indication of photographing is made (Step S24). Unless both agree with each other, the photographing operation ends without making the effect indication.

Also in the information processing system 10 of the user A, the effect indication of photographing is made as required (Step S25). This effect indication may be made at its own timing of the information processing system 10 of the user B or may be made at a timing of making the effect indication of the information processing system 10 of the user B and the information processing system 10 of the user C.

In the above-described example, an image including the character A itself of the user A is photographed without displaying a camera in the game space and without special operations of the user A. However, other examples are possible.

For example, when the user A makes no special operation, the character A of the user A who photographed may not be included.

It is possible that a camera is displayed above the game space, and the user A controls positions and directions of the camera so as to photograph at desired positions and in desired directions.

It is possible that normally the character A carries on the camera, but in photographing, the camera is positioned and operated for photographing independently of the character operation.

It is possible that the camera is treated as one of items and is owned by one user or used among the users.

It is also possible that the camera is treated as one object and set at a prescribed photographing position to photograph at the prescribed position. The prescribed position is a memory photographing site shared by all the users, which provides a topic common among the users.

(Control of Photographing Indicated Target)

Figure 10:
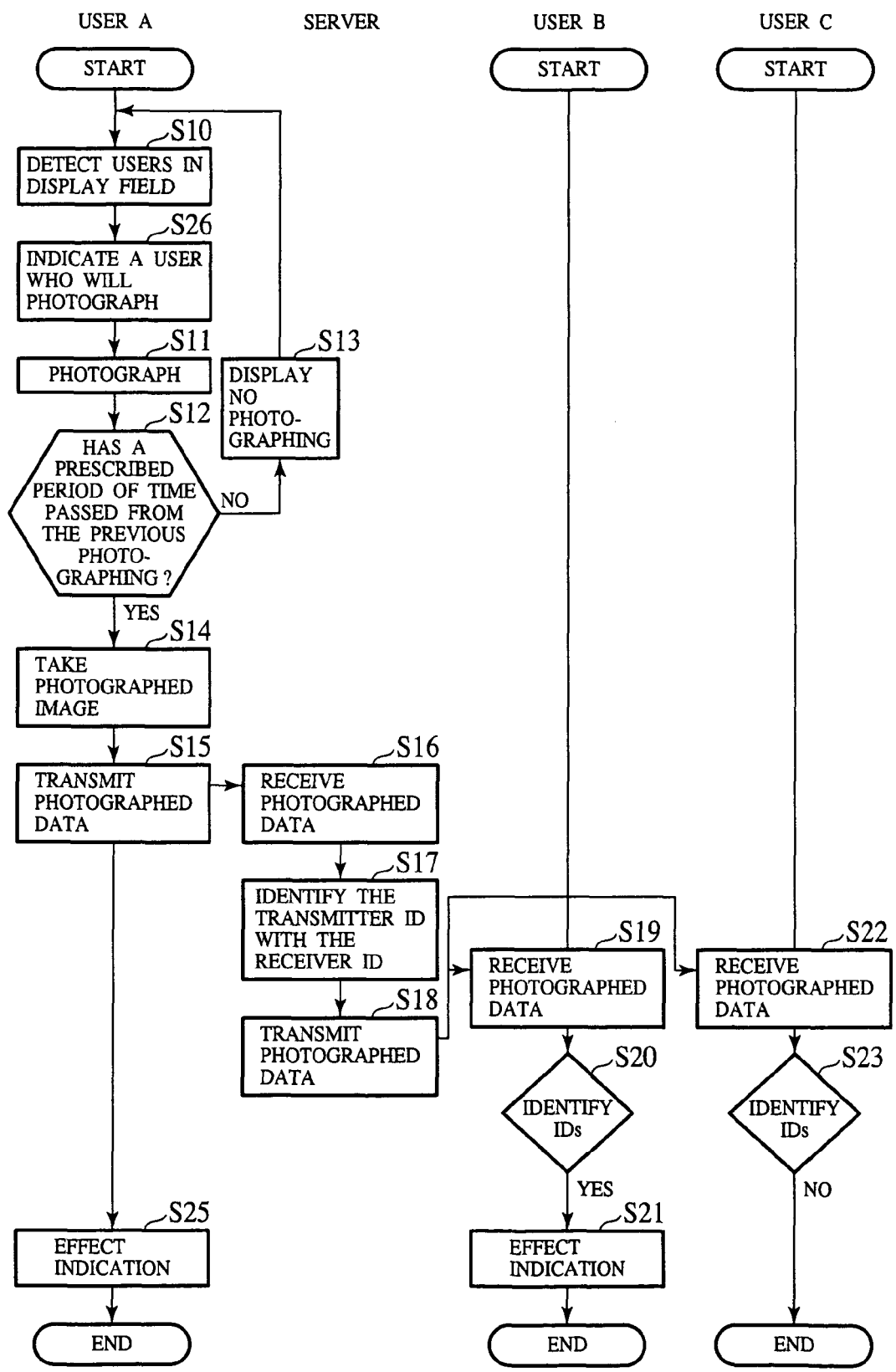
FIG. 10 is a flow chart of the control of photographing with a target indicated of the network system according to the embodiment of the present invention.
Figure 11:
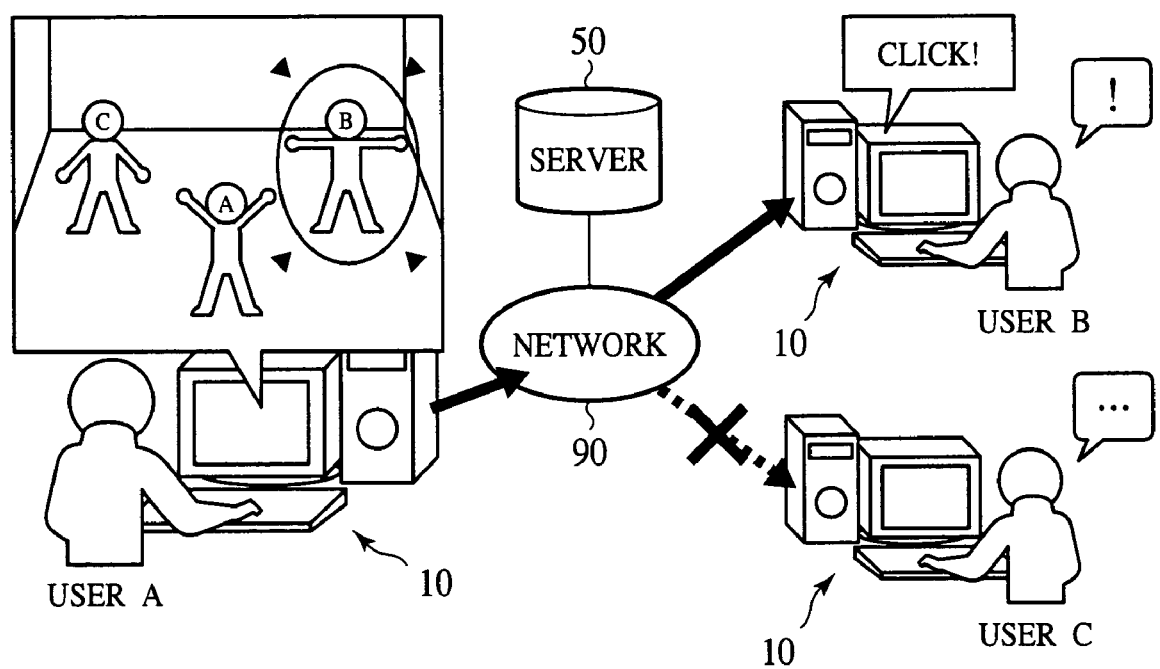
FIG. 11 is a view of the effect indication of photographing of the network system according to the embodiment of the present invention.

The control of photographing an indicated target in the network system according to the present embodiment will be explained with reference to FIGS. 10 to 13. FIG. 10 is a flow chart of the processing for photographing of the information processing systems 10 and the server 50. FIG. 11 is a view of the effect indication for photographing. FIG. 12 is photographed images. FIG. 13 is explanatory views of other example of photographing.

In the present example, an object to be photographed is indicated, and the object alone is photographed. The effect indication of photographing is made only in the information processing system 10 of an indicated user. The effect indication is not made in the information processing systems 10 of the users who have not been indicated, and these information processing systems 10 cannot know the photographing operation itself.

The operation of photographing in the game space, as shown in FIGS. 6 and 7, made when the user A indicates a character by the information processing system 10 will be explained.

Before the user A makes the photographing operation (Step S11), he indicates a character to be photographed (Step S26). As shown in FIG. 11, the user A indicates the character B as an object to be photographed out of the characters A, B, C displayed on the display monitor 26. Then, the photographing operation is made (Step S11).

Figure 12A:
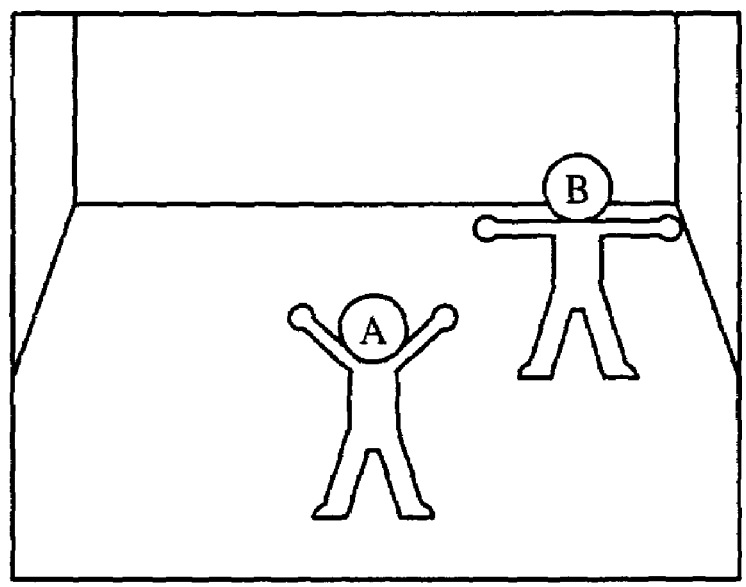
FIG. 12 is photographed images of the network system according to the embodiment of the present invention.
Figure 12B:
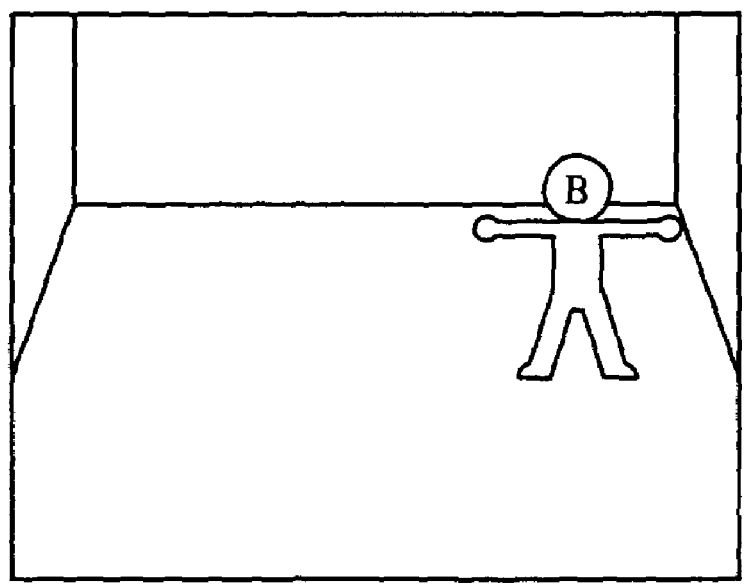

The images photographed are as shown in FIGS. 12A and 12B. FIG. 12A is the photographed image including the character A of the user A, who photographed. FIG. 12B is the photographed image which does not include the character A of the user A, who photographed.

The receiver ID code 106 of the photographing data 100 of such photographing includes only the ID of the information processing system of the user B, who was the object to be photographed and does not include the IDs of the other users' information processing systems.

Accordingly, as shown in FIG. 11, the information processing system 10 of the user B receives the photographing data (Step S19) and identifies whether or not the receiver ID of the photographing data agrees with his own ID (Step S20). In this case, where the former agrees with the latter, the effect indication of photographing is made (Step S21). On the other hand, the information processing system 10 of the user C receives the photographing data (Step S22) and identifies whether or not the receiver ID of the photographing data agrees with its own ID (Step S23). In this case, where the former does not agree with the latter, the effect indication is not made.

In indicating a target in photographing, the effect indication of photographing is made in the information processing system of the indicated character, and the user alone of the character can know that the photographing operation has been done.

Figure 13A:
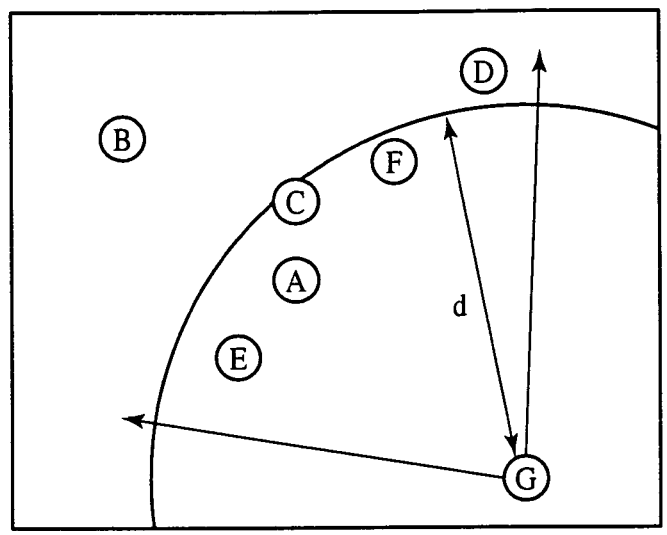
FIG. 13 is explanatory views of another example of photographing of the network system according to the embodiment of the present invention.
Figure 13B:
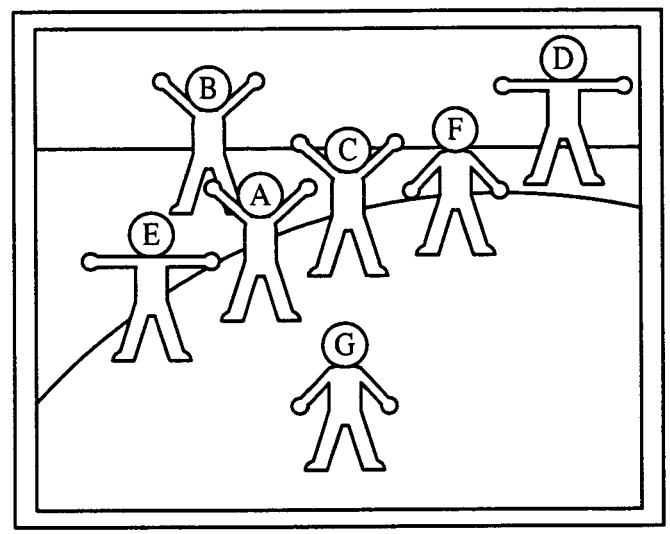
Figure 13C:
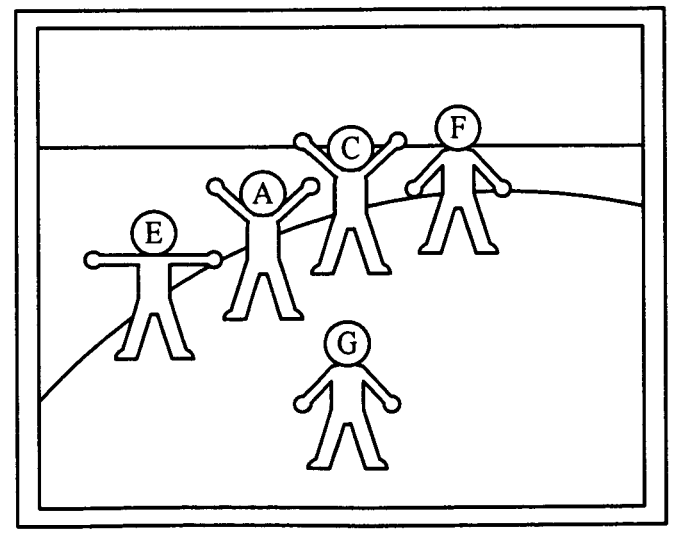

In the above-described example, a user indicates a character he wants to photograph but can collectively indicate characters. For example, as shown in FIG. 13A, when characters A, B, C, D, E, F and G are included in the game space, a distance d from the character G is indicated. As shown in FIG. 13B, the image as viewed from the character G includes all the characters A, B, C, D, E, F and G, and by indicating characters present within a distance d from the character G, as shown in FIG. 13C, the photographed image obtained by collectively indicating the characters A, C, E, F and G, omitting the characters B and D can be obtained.

When one user photographs, the characters of the other users may cross the camera or make other motions, unconsciously disturbing his photographing. To prevent this, it is possible to inform the users who have not been indicated that he is photographing. When a target to be photographed is indicated, and the photographing mode is started, it is possible that a special game space for photographing is formed for the users involved in photographing to thereby exclude the characters of the other users from the game space.

(Photographed Times Event)

Figure 14:
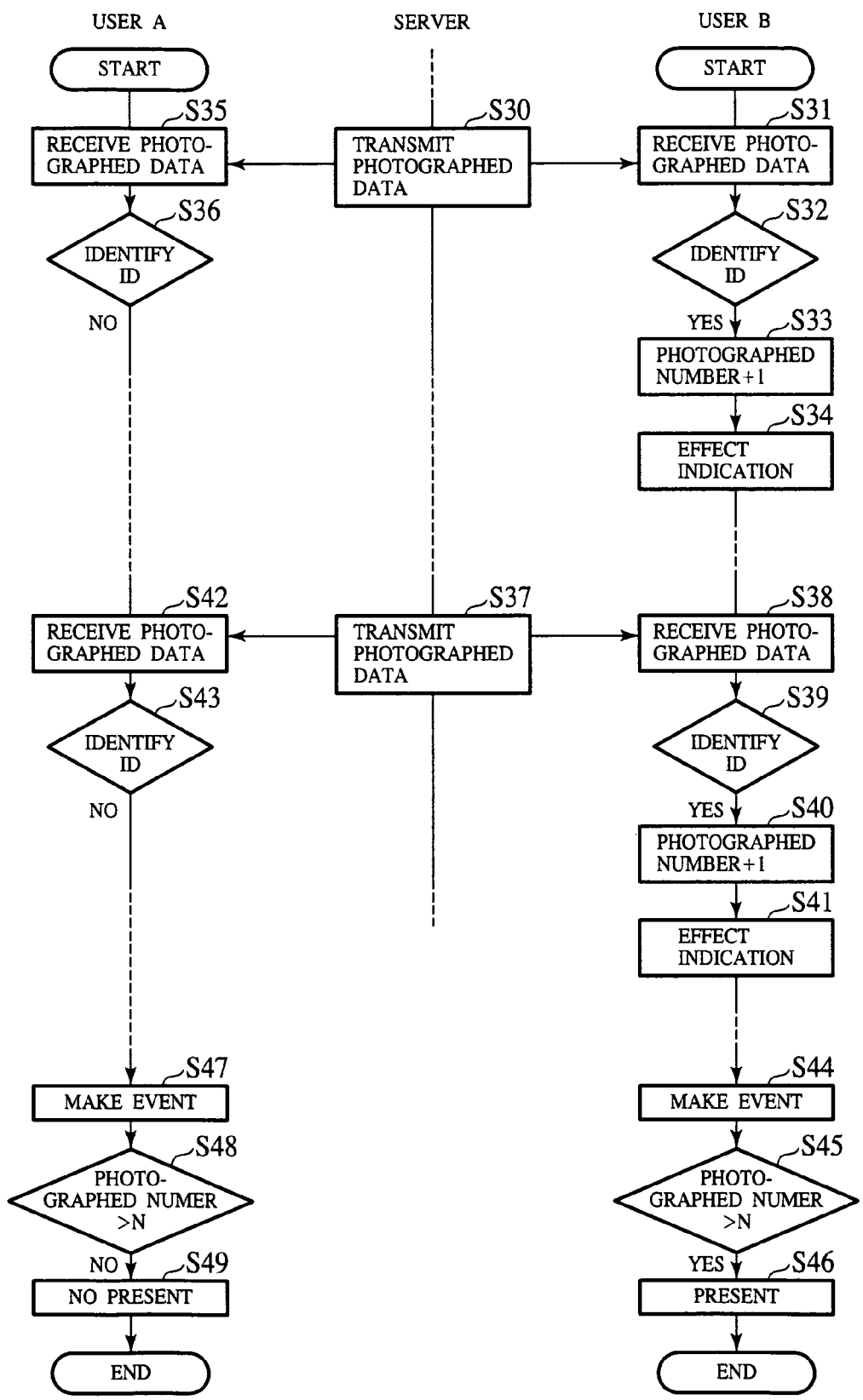
FIG. 14 is a flow chart of the processing of the photographed times event of the network system according to the embodiment of the present invention.
Figure 15A:
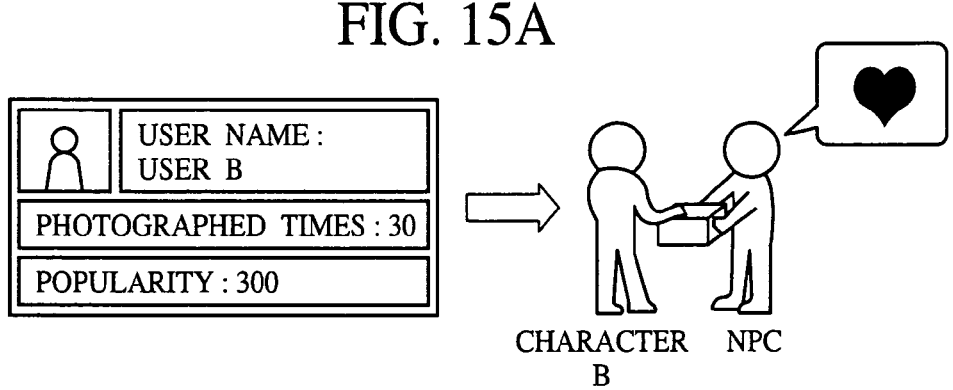
FIG. 15 is explanatory views of the photographed times event of the network system according to the embodiment of the present invention.
Figure 15B:
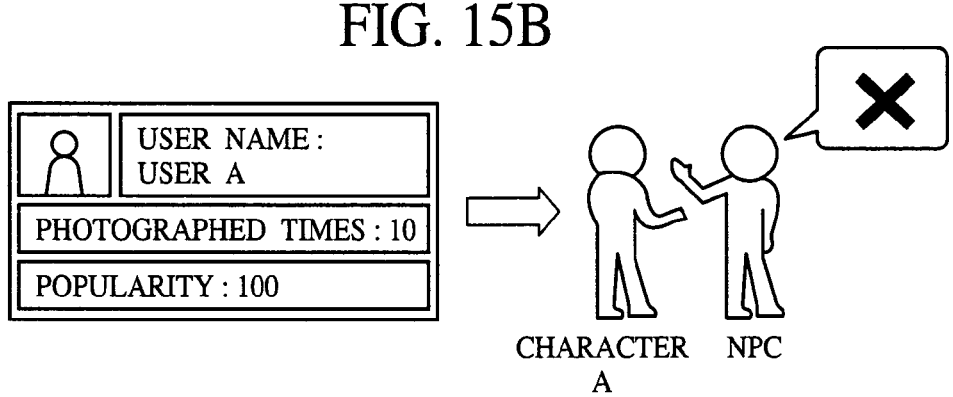

The control of the photographed times event of the network system according to the present embodiment will be explained with reference to FIGS. 11 and 15. FIG. 14 is a flow chart of the processing of the information processing system 10 and the server 50 for the photographing times event. FIG. 15 is explanatory views of the photographed times event.

In the game space as shown in FIGS. 6 and 7, the photographing operation of one of the users will be explained.

One of the users photographs and transmits the photographing data to the server 50. The server 50 receives the photographing data and transmits the photographing data to the receivers' information processing systems via the network 90 (Step S39).

The information processing system 10 of the user B receives the photographing data (Step S31). The information processing system 10, which has received the photographing data, identifies whether or not the receiver ID of the photographing data agrees with its own ID (Step S32). Because the character B is the object to be photographed, its own ID agrees with the receiver ID. One point is added to the photographing times counter (Step S33), and the effect indication of the photographing operation is made (Step S34).

On the other hand, the information processing system 10 of the user A also receives the photographed data (Step S35). The information processing system 10, which has received the photographing data, identifies whether or not the receiver ID of the photographing data agrees with its own ID (Step S36). Because the character A is not to be photographed, the receiver ID does not agree with its own ID. Then the effect indication of the photographing operation is not made, and no point is added to the photographed times counter.

Furthermore, one of the users photographs and transmits the photographing data to the server 50. The server 50 transmits the photographing data to the receivers' information processing systems 10 (Step S37).

The information processing system 10 of the user B receives the photographing data (Step S38). The information processing system 10, which has received the photographing data, identifies whether or not the receiver ID of the photographing data agrees with it own ID (Step S39). Because the character B is again to be photographed, the receiver ID agrees with its own ID. One point is added to the photographed times counter (Step S40), and the effect indication of the photographing operation is made (Step S41).

On the other hand, the information processing system 10 of the user A also received the photographing data (Step S42). The information processing system 10, which has received the photographing data, identifies whether the receiver ID of the photographing data agrees with its own ID (Step S43). Because the character A is not to be photographed, the receiver ID does not agree with its own ID. The effect indication of the photographing operation is not made, and no point is added to the photographed times counter.

Times of photographing the respective characters are counted by the photographed times counters. Counted numbers of the photographed times counters indicate popularity of the characters.

In the present embodiment, motions different depending on counted numbers of the photographed times counters are made for an event. For example, when the characters of the users speak to an NPC (Non Playable Character) in the lobby or others, different motions are made.

When the character B of the user B, who is popular, speaks to the NPC, and the event starts (Step S44), it is judged whether or not a count number of the photographed times counter is larger than N (Step S45). When the counted number is larger than N, as shown in FIG. 15A, a prescribed message and a present are given by the NPC (Step S46).

When the character A of the user A, who is not popular, speaks to the NPC, and the event starts (Step S47), it is judged whether or not a count number of the photographed times counter is larger than N (Step S48). When the count number is smaller than N, a prescribed message is given by the NPC, and no present is given (Step S49).

In the above-described example, the event that presents are given by the NPC depending on count numbers of the photographed times counters has been explained. However, other events may be used; for example, photographed times are used as several steps of a parameter, a) 0–N times, b) N+1–M times, c) M+1 times and more, or the like, and doors for the characters to go through are different depending on the steps.

Other parameters, such as popularity, etc., other than the count numbers of the photographed times counters may be used, and based on the parameters, an event can be made, or different events may be made.

Popularity ranking of the characters may be prepared based on count numbers of the photographed times counters. Based on the popularity ranking, premiums may be given, or game abilities may be increased.

(Special Effects)

Figure 16:
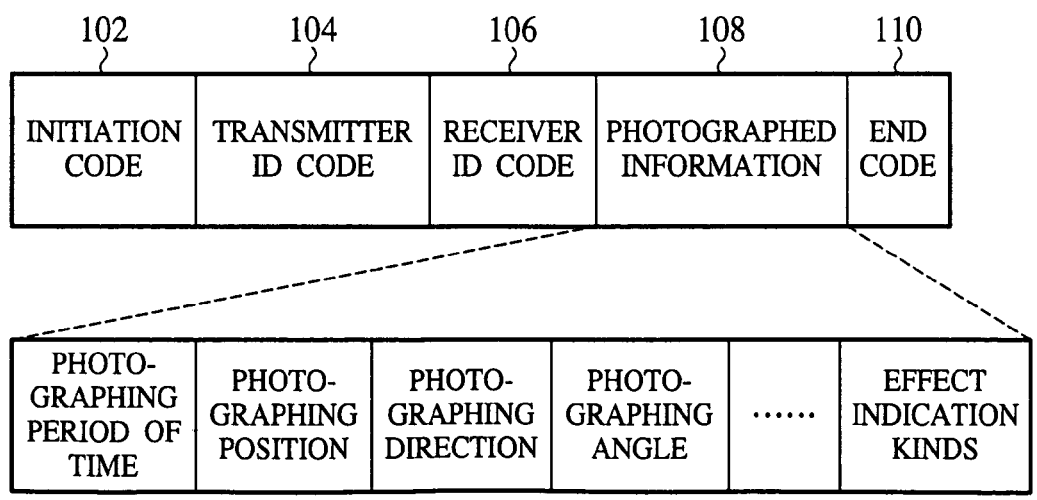
FIG. 16 is a view of the photographed data of the network system according to the embodiment of the present invention.
Figure 18:
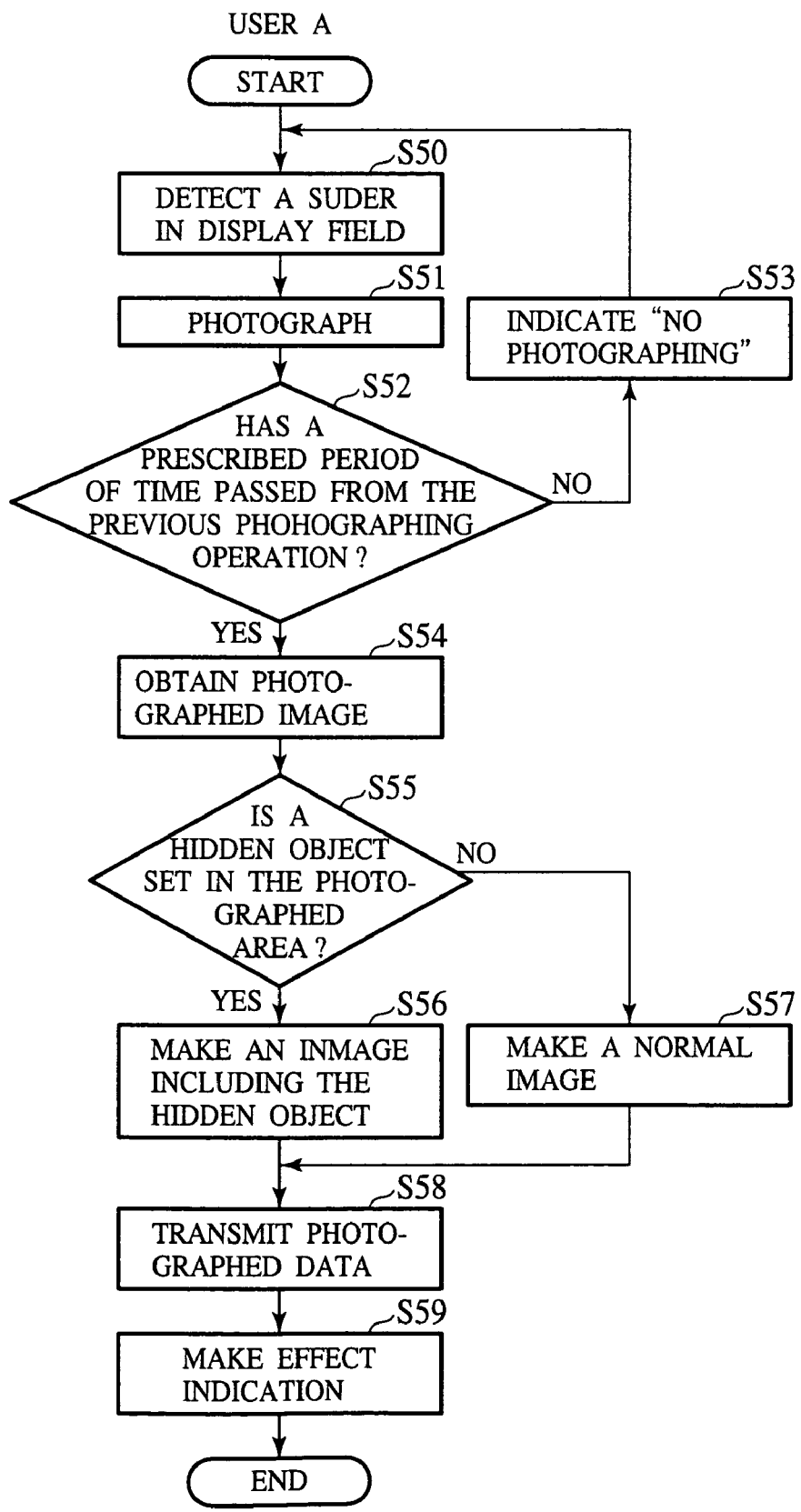
FIG. 18 is a flow chart of the control of psychic pictures as one example of the special effects of the network system according to the embodiment of the present invention.
Figure 19A:
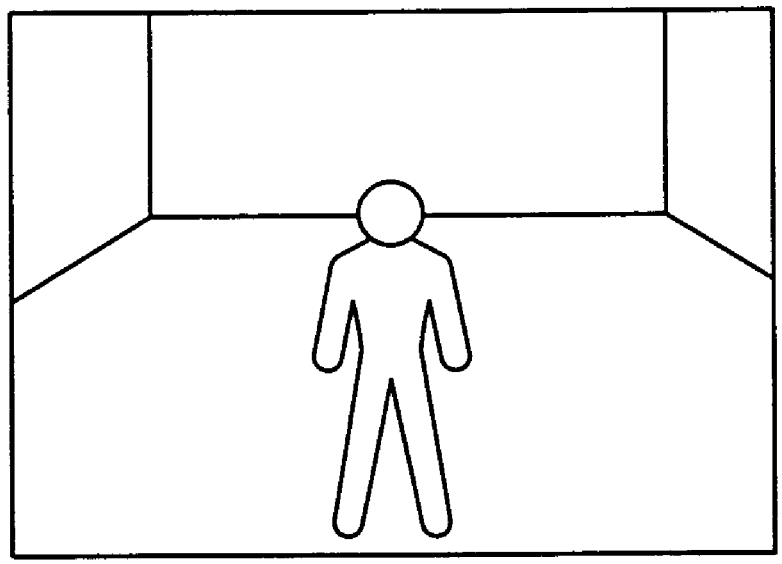
FIG. 19 is explanatory views of psychic pictures as one example of the special effects of the network system according to the embodiment of the present invention.
Figure 19B:
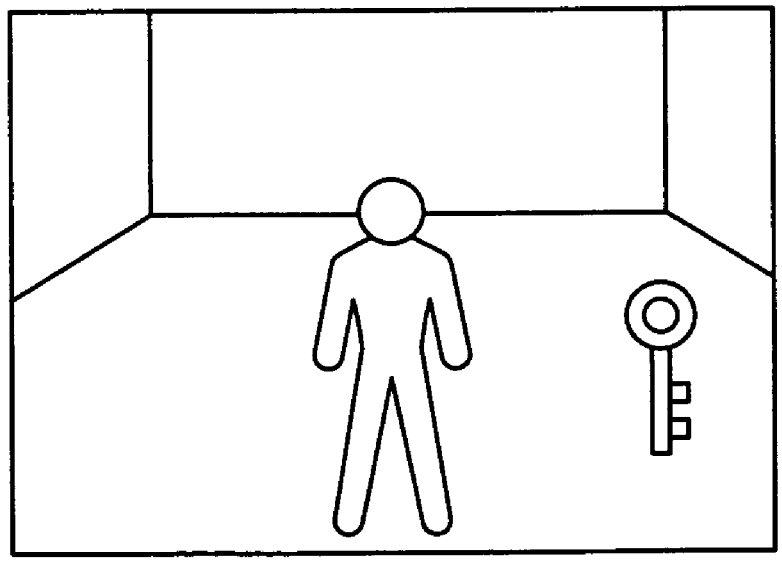

Special effects of photographing in the network system according to the present embodiment will be explained with reference to FIGS. 16 to 20. FIG. 16 is a view of the photographing data. FIG. 17 is explanatory views of flashlight source which is one example of the special effects. FIG. 18 is a flow chart of the control of taking a psychic picture which is one example of the special effects. FIG. 19 is explanatory views of a psychic picture which is one example of the special effect. FIG. 20 is explanatory views of a copyright indication which is one example of the special effects.

In the present embodiment, the photographing information 108 of photographing data 100 includes effects codes indicative of kinds of the effect indication. An effect indication of the photographing operation is decided based on an effect code.

The flashlight source, which is one example of the special effects, will be explained.

Figure 17A:
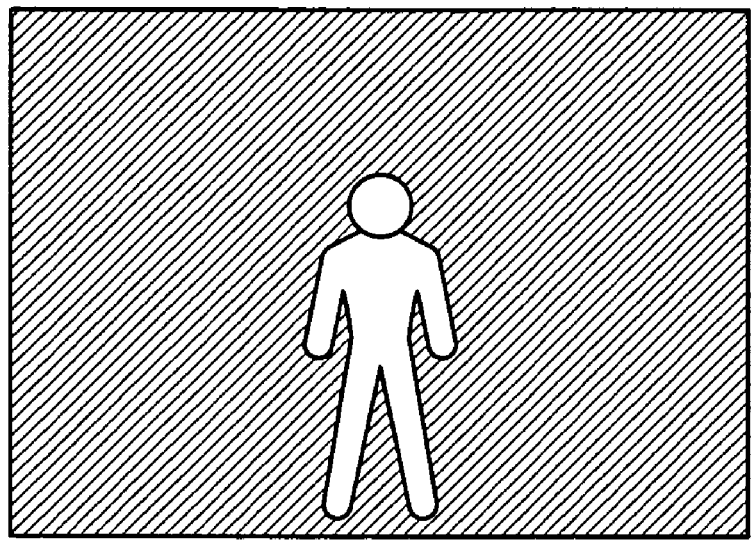
FIG. 17 is explanatory views of the flashlight source as one example of the special effects of the network system according to the embodiment of the present invention.
Figure 17B:
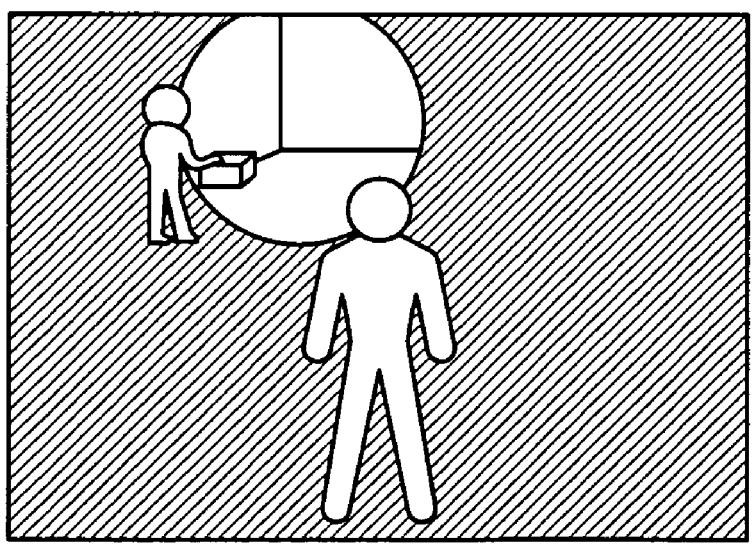

In adventure games, etc., as shown in FIG. 17A, a course is in the dark, and the surroundings are often invisible. In such state, when another character photographs, as shown in FIG. 17B, the part ahead of the character is momentarily lighted by the flash as the light source, and it is momentarily light in the direction of photographing, whereby a state of the course can be visually confirmed, or objects in the photographed area are momentarily lighted and can be recognized.

Not only the character who photographs, but also other characters around the character can visually recognize the part lighted by the flashlight source. In adventure games played by a team, only the characters of the team may visually recognize the part lighted by the flashlight source.

In the present embodiment, to realize dark, fog is provided in the game space, and the color of the fog is black. In a case that the flashlight source is the effect indication, the color of the fog is momentarily made transparent in a photographed area to thereby make the effect indication.

A psychic picture as one example of the special effects will be explained.

As shown in FIG. 18, the information processing system 10 of the user A incessantly detects characters in the display field, based on positions and viewpoints of the character A (Step S50). Here, when the user makes the photographing operation (Step S51), it is judged whether or not a prescribed period of time has passed from the previous photographing operation (Step S52). Unless the prescribed period of time has passed, the "no photographing" indication is made (Step S53), and then Step S50 follows.

When the prescribed period of time has passed from the previous photographing operation, and photographing is possible, a photographed image in the game space at this time is obtained (Step S54). The photographed image is an image reflecting the game space as shown in FIG. 19A.

Then, it is detected whether or not a hidden object is set in the photographed area (Step S65). When a hidden object is set, as shown in FIG. 19B, an image in which the hidden object (indicated by the key mark in the drawing) is overlapped is made (Step S56). Unless the hidden object is set, a normal photographed image is made (Step S57).

Then, the information processing system 10 of the user A transmits the photographing data (Step S58). In the information processing system 10 of the user A, the effect indication is made, and the image including the hidden object made in Step S56 is displayed (Step S59).

Such photographing operation can make the hidden object which is not normally displayed in the game space visually recognizable.

Examples of the hidden object are, e.g., hints, key items, hidden characters, hidden doors, etc of a game.

Figure 20A:
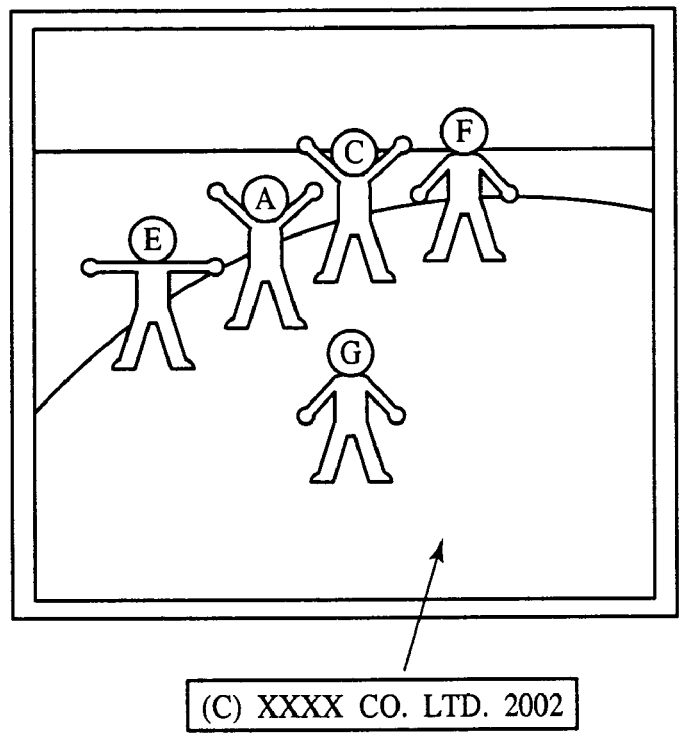
FIG. 20 is explanatory views of a copyright indication as one example of the special effects of the network system according to the embodiment of the present invention.
Figure 20B:
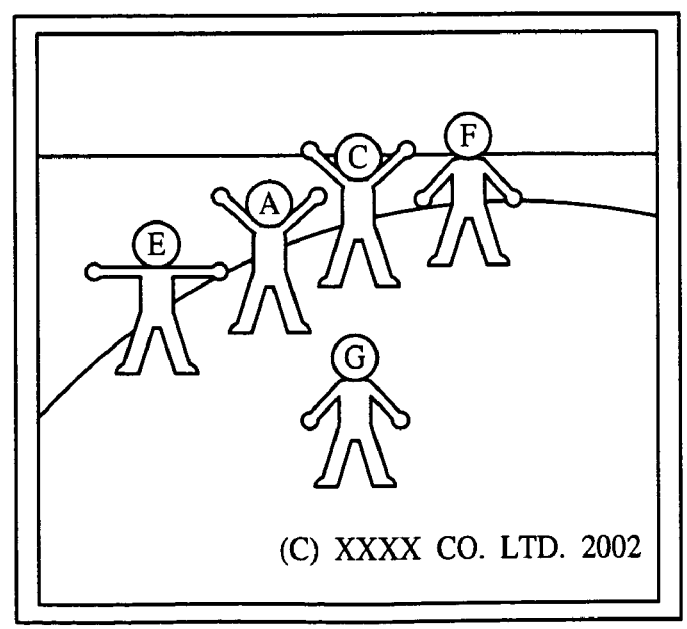

It is also possible that as, shown in FIG. 20, an image or text data of a copyright indication of a contents provider ((C) XXXX Co. Ltd. 2002) as the hidden object is stored in a memory, and the copyright indication is forcedly printed in a photographed picture. When the game space as shown in FIG. 20A is photographed, the copyright indication ((C) XXXX Co. Ltd. 2002) information stored in the memory is read out and synthesized to overlap at, e.g., a prescribed lower right part. The copyright of the game producer can be thus securely protected.

(Itemization of the Camera)

Figure 21:
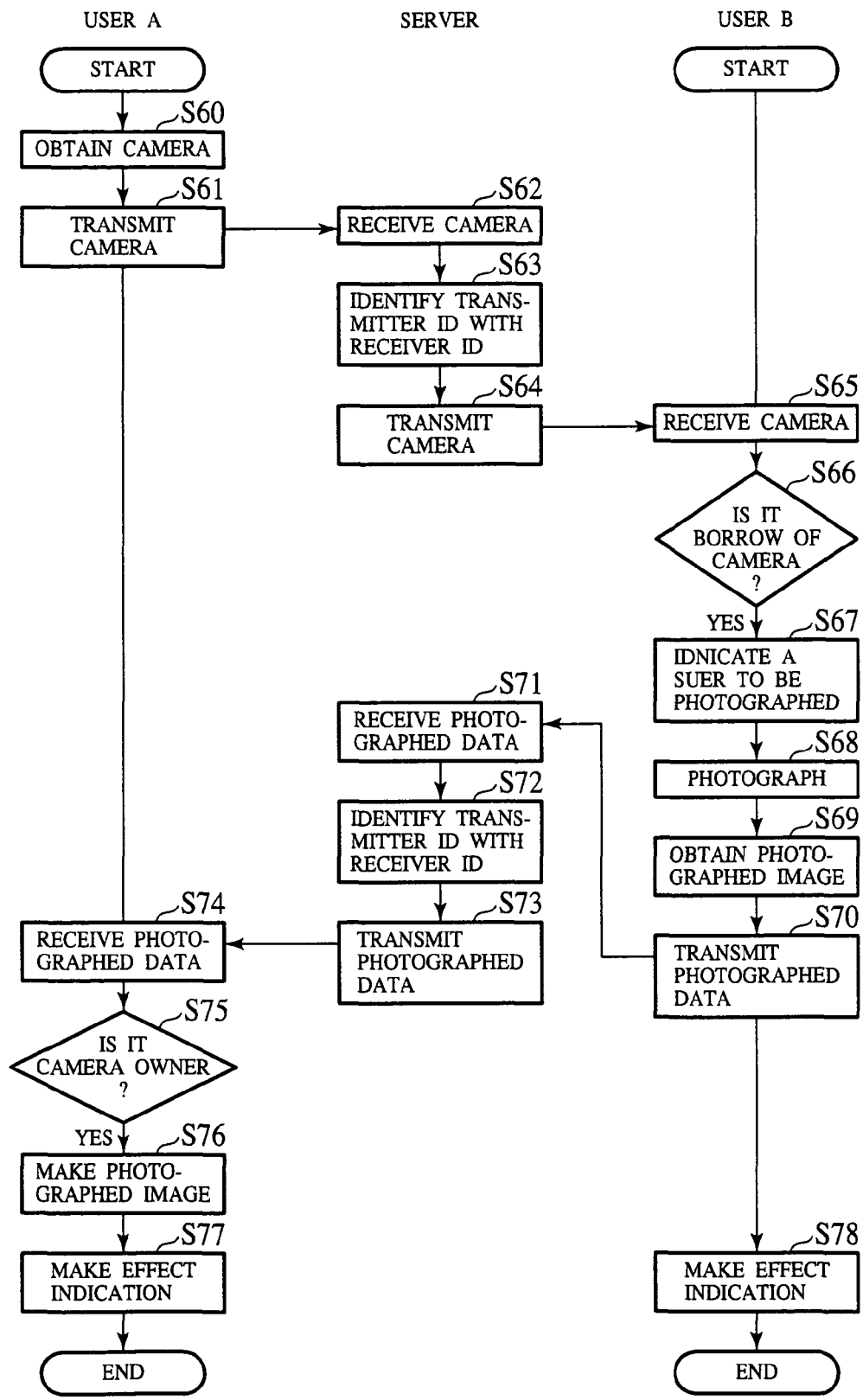
FIG. 21 is a flow chart of the control of itemizing the camera of the network system according to the embodiment of the present invention.

Itemization of the camera of the network system according to the present embodiment will be explained with reference to FIGS. 21 and 22. FIG. 21 is a flow chart of the control of itemizing the camera. FIG. 22 is explanatory views of the itemization of the camera.

The operation that the user A obtains the itemized camera and lends the camera to the user B for the user A to be photographed will be explained.

Figure 22A:
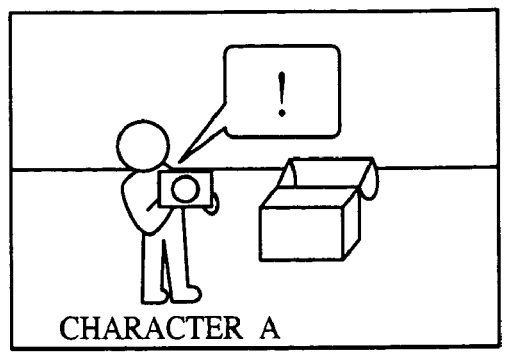
FIG. 22 is explanatory views of itemizing the camera of the network system according to the embodiment of the present invention.

The user A finds the itemized camera, and as shown in FIG. 22A, he obtained the camera (Step S60). The user A is registered as the owner of the obtained camera. For the user A to lend the camera to the user B, the information processing system 10 of the user A puts the ID code of the owner (user A) who is the transmitter, and the ID code of the borrower (user B) who is the receiver in the camera data and transmits the camera data to the server 50 via the network 90 (Step S61).

The server 50 receives the camera data (Step S62). The server 50, who has received the camera data, identifies whether the ID of the transmitter information processing system 10 of the camera data with the ID of the receiver information processing system 10 of the camera data (Step S63) and transmits the camera data to the information processing system 10 of the receiver via the network 90 (Step S64).

Figure 22B:
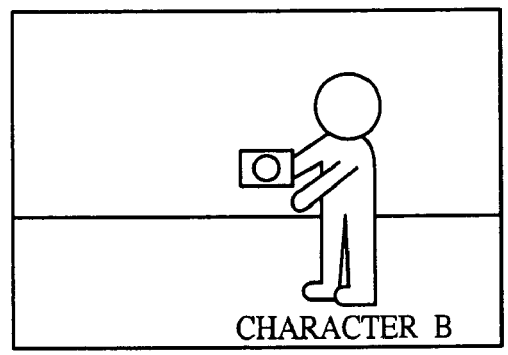

The information processing system 10 of the user B receives the camera data (Step S65). The information processing system 10, who has received the camera data, identifies whether the receiver ID of the camera data agrees with its own ID, i.e., whether or not he is the borrower (Step S66). When the former agrees with the latter, as shown in FIG. 22B, the operation of photographing with the camera is started. Unless the former agrees with the latter, the user B cannot use the camera.

Figure 22C:
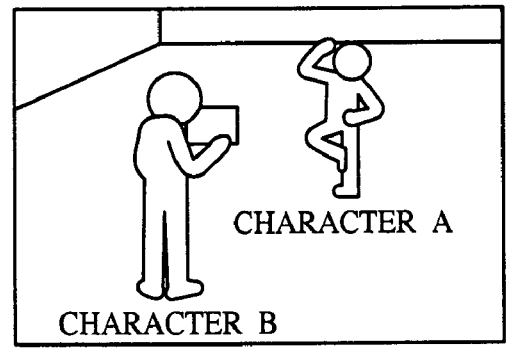

The information processing system 1 of the user B incessantly detects a character in the display filed based on a position and a viewpoint and indicates a user-to-be-photographed (Step S67). In this case, as shown in FIG. 22C, the character of the user A is photographed (Step S68). The information processing system 10 of the user B obtains the photographed image and produces photographing data (Step S69), and subsequently transmits the photographing data to the user A via the server 50 (Step S70). The ID of the user B as the transmitter ID code and the ID of the user A as the receiver ID code are put in the photographing data.

The server 50 receives the photographing data (Step S71). The server 50, who has received the photographing data, identifies whether or not the ID of the transmitter information processing system 10 of the photographing data with the ID of the receiver information processing system 10 (Step S72) and transmits the photographing data to the information processing system 10 of the user A, who is the receiver, via the network 90 (Step S73).

Figure 22D:
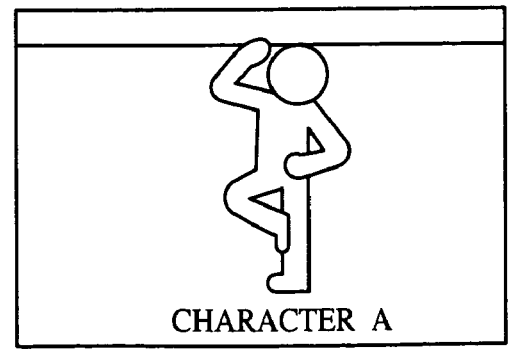

The information processing system 10 of the user A receives the photographing data (Step S74). The information processing system 10, who has received the photographing data, identifies whether or not the receiver ID of the photographing data agrees with its own ID (Step S75). When the former agrees with the latter, the photographed image as shown in FIG. 22D is made (Step S76). Unless the former agrees with the latter, the photographed image is not made.

Subsequently, the effect indication is made in the information processing system of the user A (Step S77), and the effect indication is made also in the information processing system 10 of the user B (Step S78).

Thus, according to the present embodiment, the camera is lent and borrowed among the users for the users to be photographed.

(Control of Character Motions for Photographing)

Figure 23:
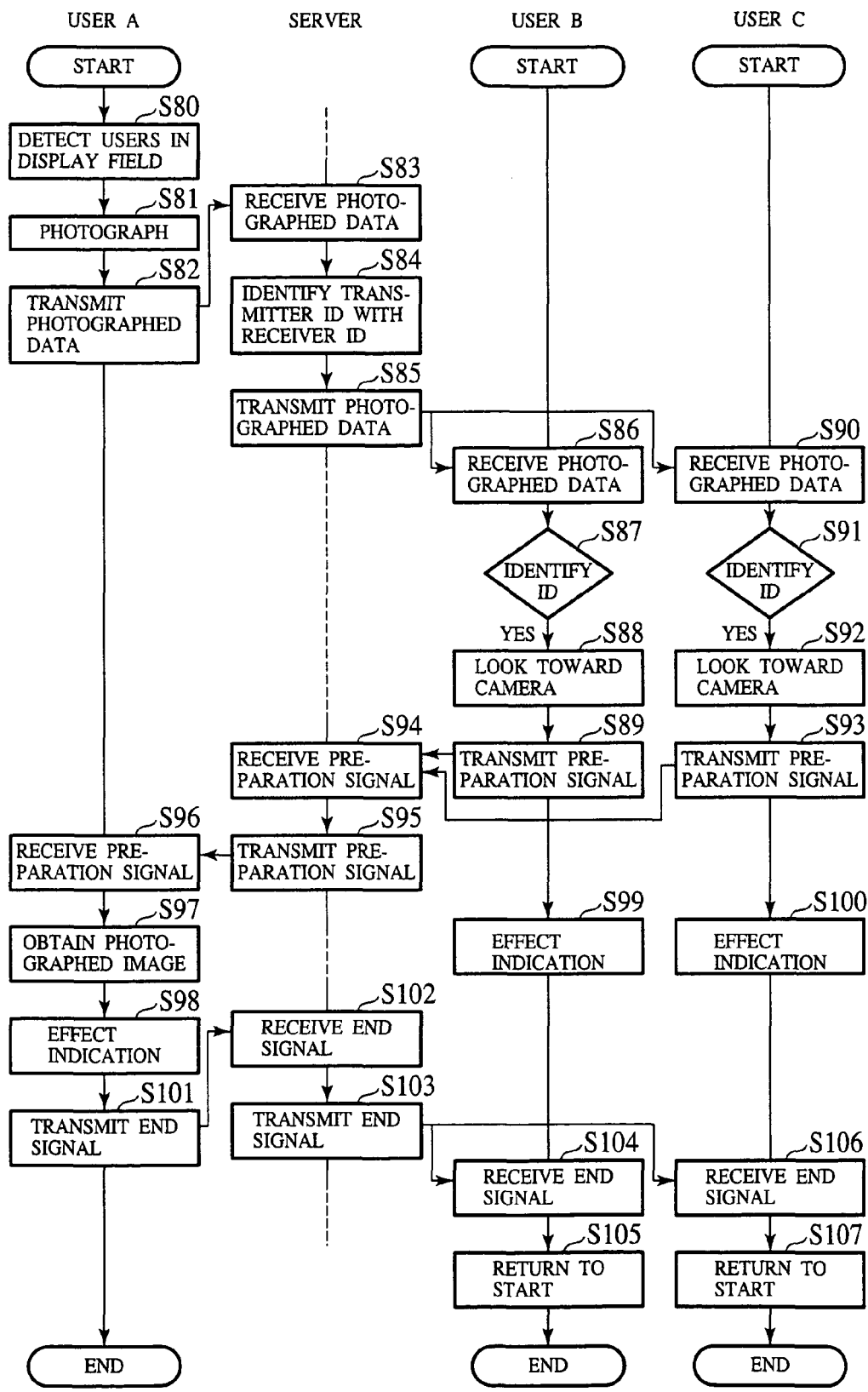
FIG. 23 is a flow chart of the control for character motions for photographing of the network system according to the embodiment of the present invention.

The control of character motions for photographing of the network system according to the present embodiment will be explained with reference to FIGS. 23 and 24. FIG. 23 is a flow chart of the control of character motions for photographing. FIG. 24 is explanatory views of the control of character motions for photographing.

The control of character motions for photographing of the network system according to the present embodiment will be explained with reference to FIGS. 23 and 24. FIG. 23 is a flow chart of the control of character motions for photographing. FIG. 24 is explanatory views of the control of character motions for photographing.

Figure 24A:
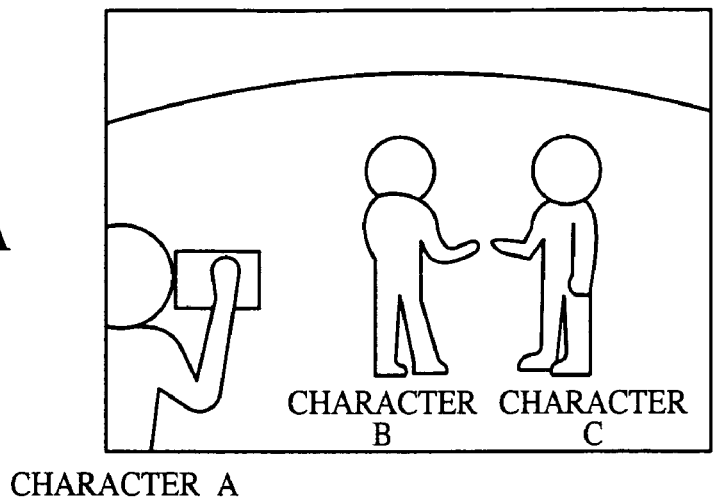
FIG. 24 is explanatory views of the control for character motions for photographing of the network system according to the embodiment of the present invention.

As shown in FIG. 24A, the character B of the user B and the character C of the user C are chatting face to face, and the character of the user A focuses the camera at them and photographs them. The information processing system 10 of the user A incessantly detects characters in the display field depending on a position and a viewpoint of the camera operated by the character A (Step S80). In FIG. 24A, the character B and the character C are detected.

Here, the user A makes the photographing operation (Step S81), and usually a photographed image is obtained in the game space at this time. However, in this case, no photographed image is obtained, but photographing data is prepared and transmitted to the server 50 (Step S82). The photographing data 100 includes, as usual, the ID of the transmitter information processing system 10, the ID of the receiver information processing system 10, and photographing information.

The server 50 receives the photographing data (Step S83). The server 50, who has received the photographing data, identifies the ID of the transmitter information processing system 10 of the photographing data with the ID of the receiver information processing system 10 (Step S84) and transmits the photographing data to the receiver information processing system 10 via the network 90 (Step S85).

Figure 24B:
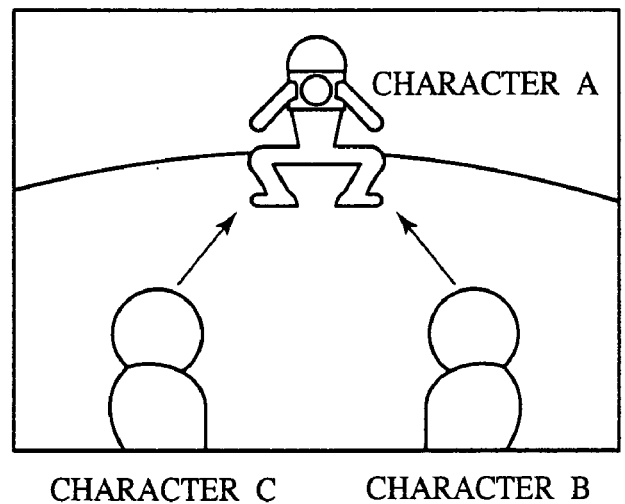

The information processing system 10 of the user B receives the photographing data (Step S86). The information processing system 10, who has received the photographing data, identifies whether the receiver's ID of the photographing data agrees with its own ID (Step 87). When the former agrees with the latter, the character B is caused to look back toward the camera (Step S88). When the character B's motion of looking back is completed as shown in FIG. 24B, a preparation signal is transmitted to the server 50 (Step S89). The preparation signal includes the information that the character's motion of looking back has completed, the ID of the transmitter's (user B) information processing system 10 and the ID of the receiver s (user A) information processing system 10.

On the other hand, the information processing system 10 of the user C receives the photographing data (Step S90. The information processing system 10, who has received the photographing data, identifies whether or not the receiver's ID of the photographing data agrees with its own ID (Step S91). When the former agrees with the latter, the character C is caused to look back toward the camera (Step S92). When the character C's motion of looking back is completed as shown in FIG. 24B, a preparation signal is transmitted to the server 50 (Step S93). The preparation signal includes the information that the character's motion of looking back has completed, the ID of the transmitter (user C) information processing system 10 and the ID of the receiver (user A) information processing system 10.

The characters B and C are caused to look back but may spontaneously take poses, such as V signs, etc. When obstacles are present, the characters may be caused to make the motion of removing the obstacles or other motions to temporarily make the game space suitable for photographing.

The server 50 receives the preparation signal from the information processing system 10 of the user B and the preparation signal from the information processing system 10 of the user C (Step S94) and transmits the preparation signal to the information processing system 10 of the user A (Step S95).

The information processing system 10 of the user A receives the preparation signal (Step S96). The information processing system 10, who has received the preparation signal, has confirmed that the characters B and C, who are the objects to be photographed, have looked back toward the camera as shown in FIG. 24B, and obtains the photographed image in the game space at this time (Step S97). After the photographed image has been obtained, the effect indication is made in the information processing system 1 of the user A (Step S98), in the information processing system 10 of the user B (Step S99) and in the information processing system 10 of the user C (Step S100).

Then, the information processing system 10 of the user A transmits to the server 50 a completion signal indicating that the photographing has been completed (Step S101). The completion signal includes the information that photographing is completed, the ID of the transmitter (user A) information processing system 10 and the ID of the receiver (user B) information processing system 10.

The server 50 receives the completion signal (Step S102) and transmits the completion signal to the information processing system of the user B and the information processing system 10 of the user C (Step S103).

Figure 24C:
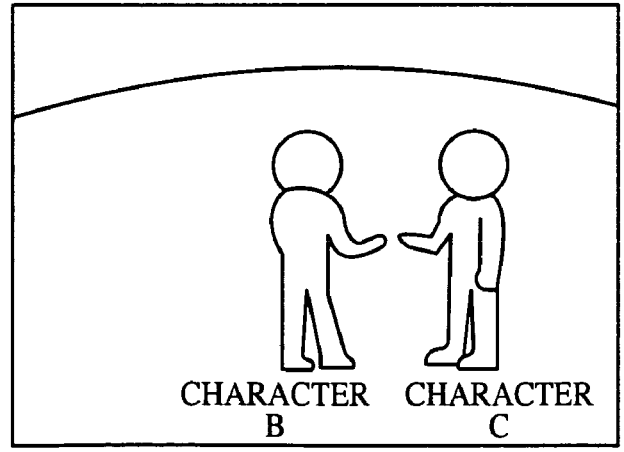

The information processing system 10 of the user B receives the completion signal (Step S104). The information processing system 10, who has received the completion signal, causes the character B to return to the initial posture from the posture of looking-back toward the camera as shown in FIG. 24C (Step S105). The information processing system 10 of the user C receives the completion signal (Step S106). The information processing system 10, who has received the completion signal, causes the character C to return to the initial posture from the posture of looking-back toward the camera as shown in FIG. 24C (Step S107). Then, the character B and the character C are returned to the state before photographed that they are chatting face to face.

As described above, according to the present embodiment, the characters can be caused to spontaneously look back only for photographing, whereby a memory picture in which the faces of all the characters are photographed can be easily taken.

Characters look toward the camera, whereby the characters themselves and also the other characters around them can easily know who were photographed.

(Control of Permitting Photographing)

Figure 25:
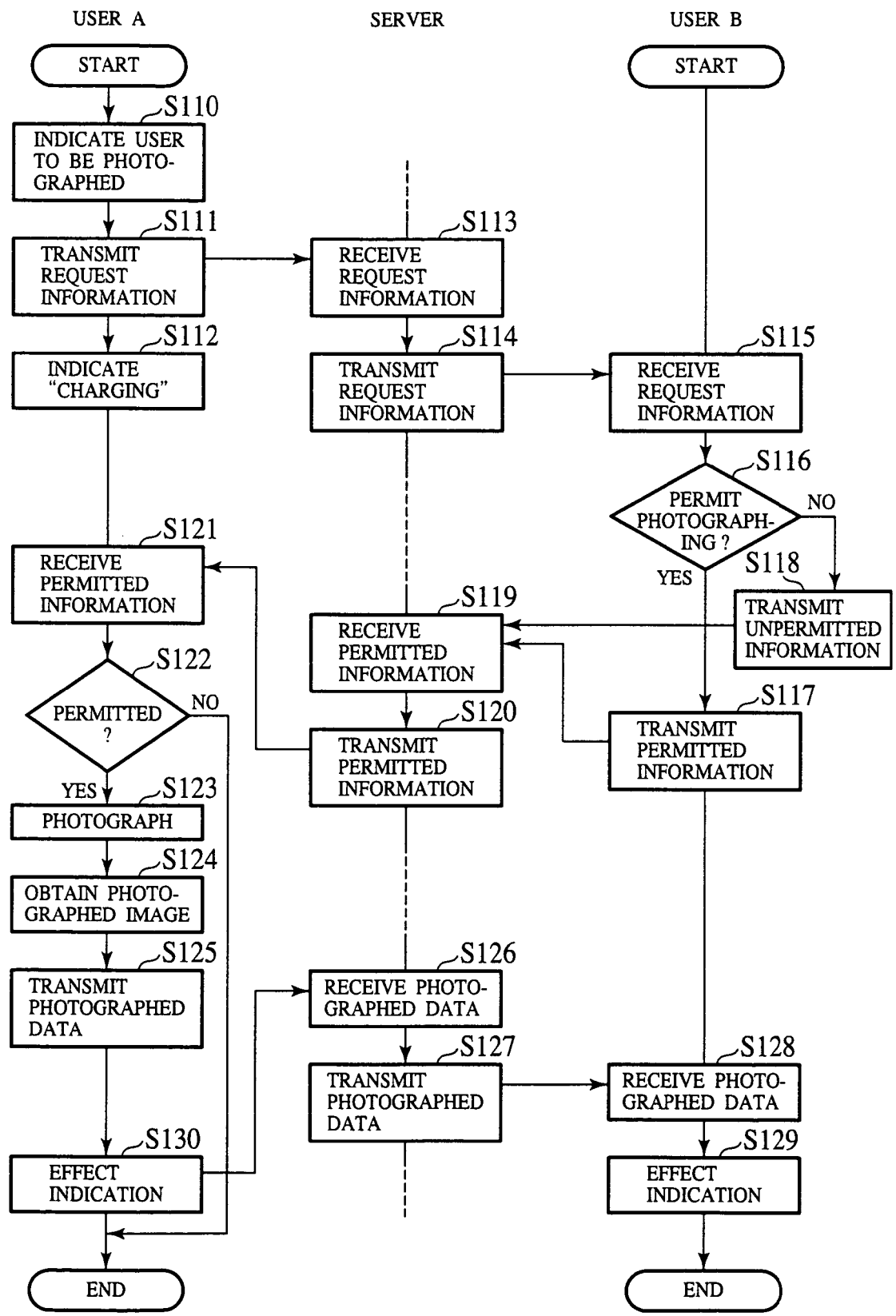
FIG. 25 is a flow chart of the control for photographing permission for photographing of the network system according to the embodiment of the present invention.
Figure 26A:
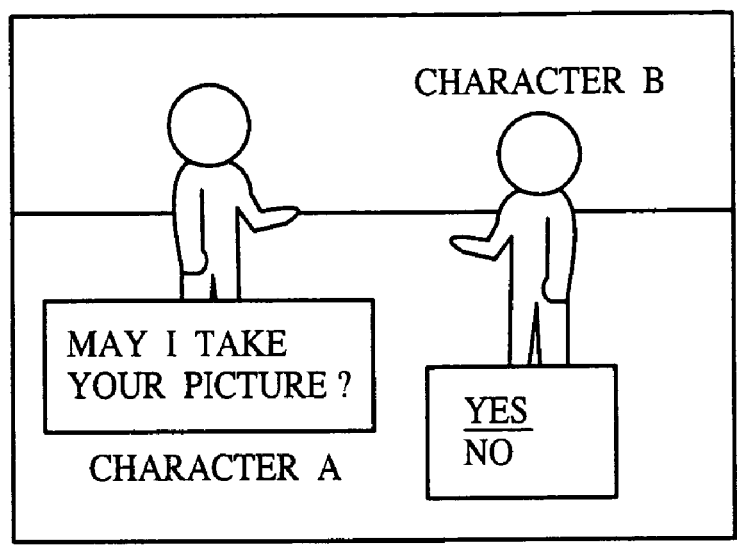
FIG. 26 is explanatory views of the control for photographing permission for photographing of the network system according to the embodiment of the present invention.
Figure 26B:
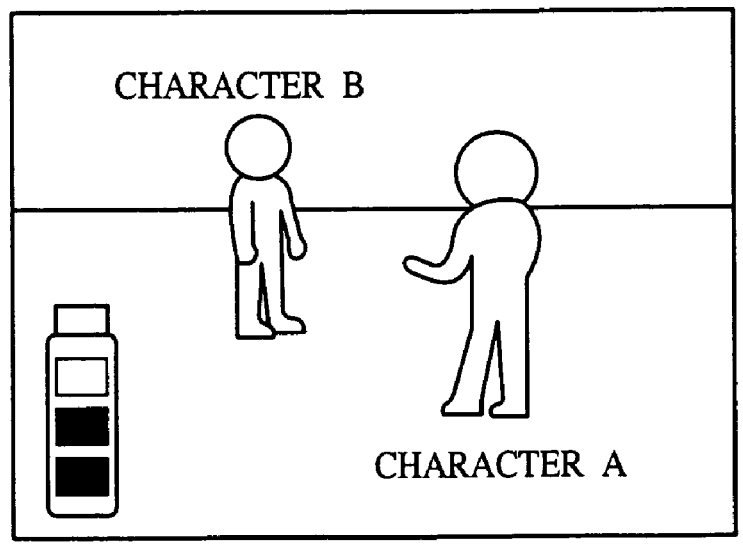

The control of permitting photographing of the network system according to the present embodiment will be explained with reference to FIGS. 25 and 26. FIG. 25 is a flow chart of the control of permitting photographing. FIG. 26 is explanatory views of the control of permitting photographing.

The user A operates the information processing system 10 to indicate the character B of the user B as an object to be photographed (Step S110). Subsequently, as shown in FIG. 26A, the character A speaks to the character M "May I take your picture?" to transmit to the user B request information for being permitted to photograph (Step S111). The character A cannot photograph without the permission of the character B. While the character A is waiting for the character B's permission, the indication "charging" is displayed on the screen of the user A (Step S112). In place of "charging", the indication "winding film", "no photographing" or others may be displayed.

The server 50 receives the request information (Step S113). The server, who has received the request information, transmits the request information to the information processing system 10 of the user B, who has been requested, via the network (Step S114).

The information processing system 10 of the user B receives the request information (Step S115). The information processing system, who received the request information, asks the user B whether or not to permit photographing (Step S116). When the user B permits, the information processing system 10 transmits permitting information (Step S117). Unless the user B permits, unpermitting information is transmitted (Step S118).

The server 50 receives the permitting information or the unpermitting information (Step S119) and transmits the information to the information processing system 10 of the user A (Step S120).

The information processing system 10 of the user A receives a permission signal (Step S121). The information processing system 10 of the user A judges based on the permission signal whether or not photographing has been permitted (Step S122). When photographing has been permitted, the indication "charging" in the screen of the user A is stopped and photographs the character B (Step S123). Unless permitted, the indication of being unpermitted is displayed, and the photographing operation is ended.

In Step S123, when the user A photographed, a photographed image in the game space at this time is obtained (Step S124). Subsequently, the information processing system 10 of the user A transmits the photographing data (Step S126).

The server 50 received the photographing data (Step S126). The server 50, who has received the photographing data, transmits the photographing data to the information processing system 10 of the user B photographed (Step S127).

The information processing system 10 of the user B receives the photographing data (Step S128). The information processing unit 10, who received the photographing data, makes the effect indication of the photographing operation (Step S129). At this time, the information processing system 10 of the user A also make the effect indication of the photographing operation (Step S130).

As described above, according to the present embodiment, photographing depends on the permission of a character to be photographed.

In the above-description, the user of a character to be photographed decides whether or not to permit photographing each time when the character is requested. However, by initially setting a character to permit photographing, the permitting signal can be automatically transmitted without the operation by the user. Oppositely, unless a character likes to be photographed, the character is initially set to unpermit photographing, and the unpermission signal can be always transmitted without the operation by the user.

As an optional setting, a flashing period of time may be set. For example, out of the choices, no flash, once flashing every 3 seconds, and once flashing every 5 minutes, one is selected. In the option of once flashing every 3 seconds, even when a plurality of users shutter within 3 seconds, flash is drawn only for the first shutter.

(Method for Transmitting Photographed Image)

Figure 27:
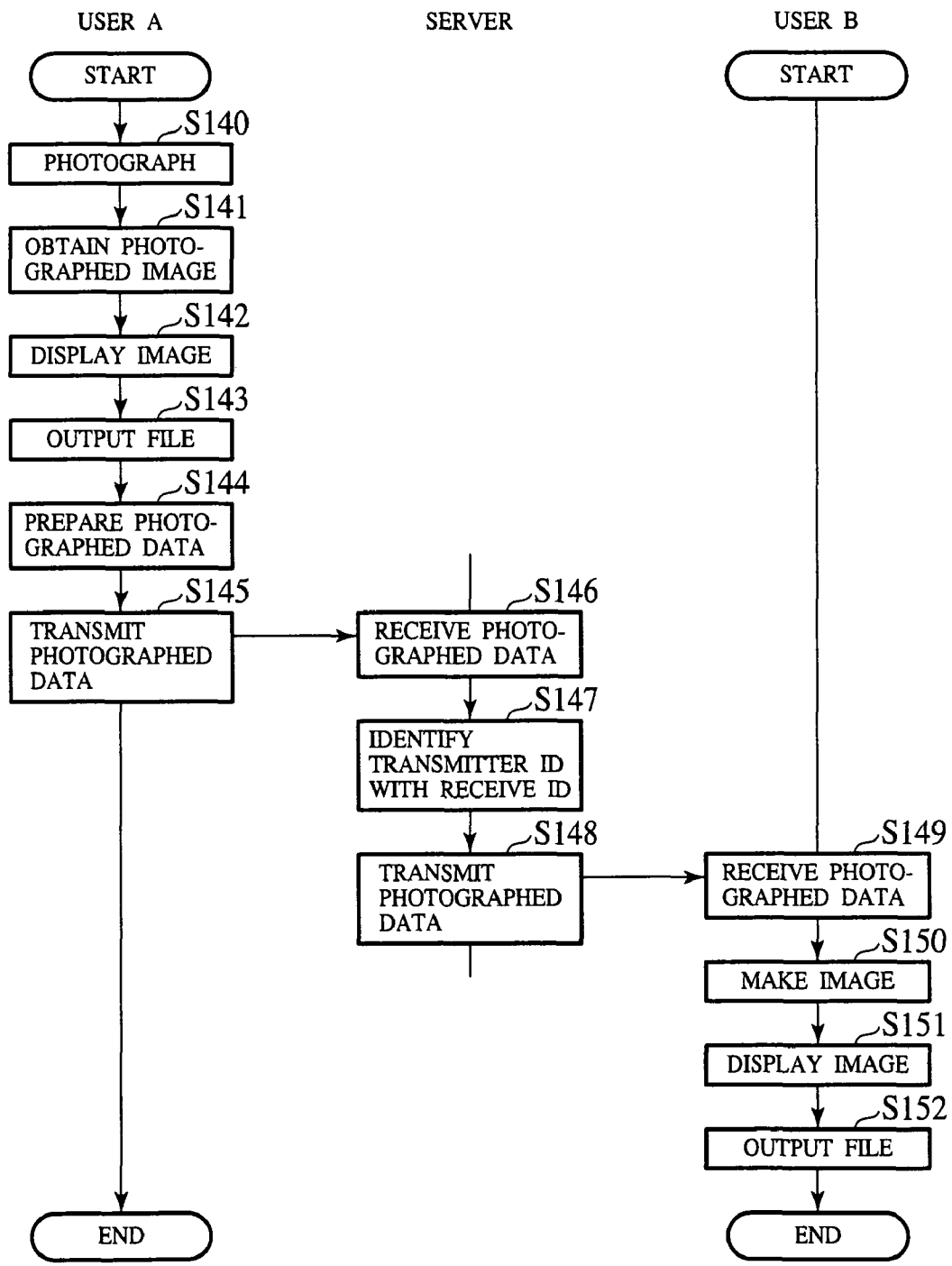
FIG. 27 is a flow chart of the method for transmitting an photographed image of the network system according to the embodiment of the present invention.
Figure 28:
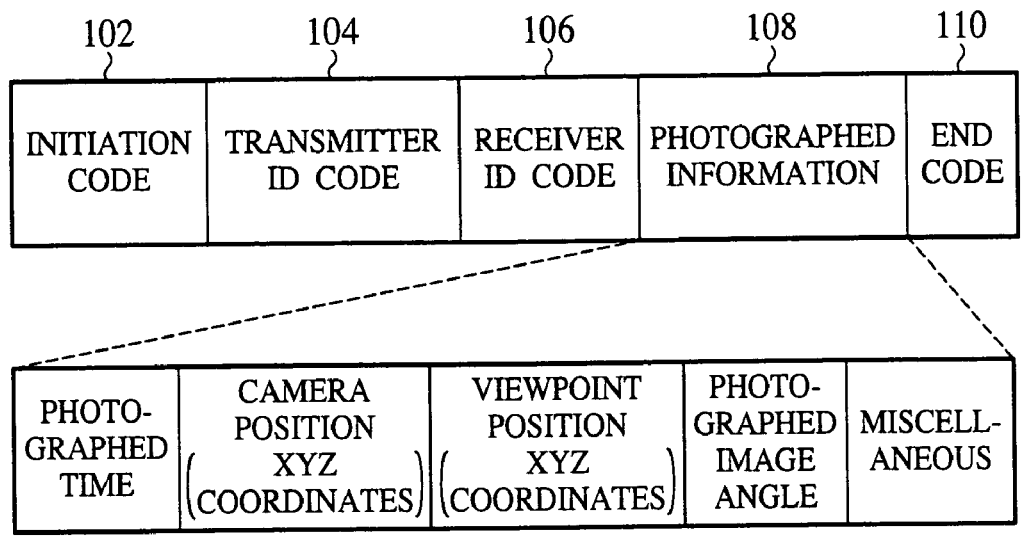
FIG. 28 is a view of the photographed data of the network system according to the embodiment of the present invention.
Figure 29:
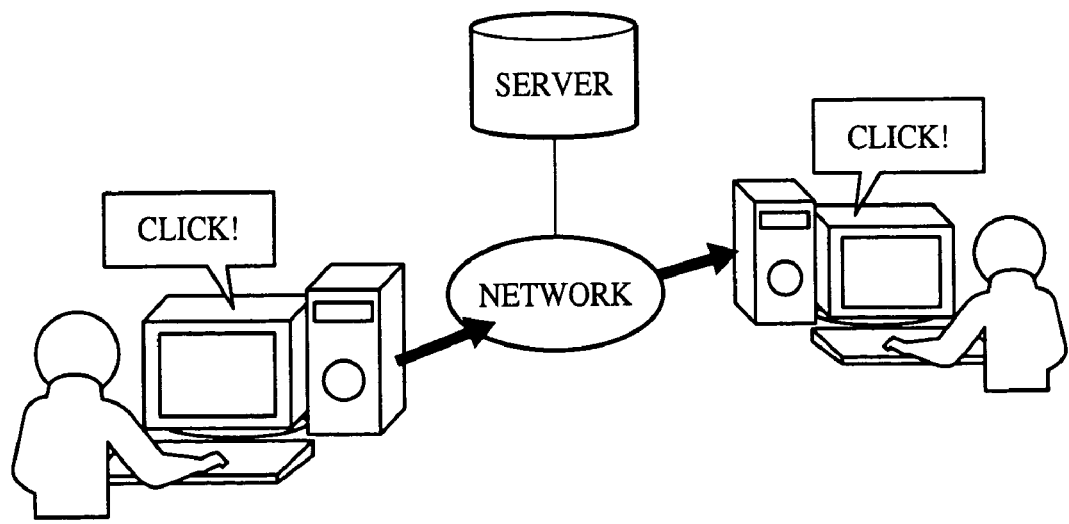
FIG. 29 is an explanatory view of the method for transmitting a photographed image of the network system according to the embodiment of the present invention.

The method for transmitting a photographed image of the network system according to the present embodiment will be explained with reference to FIGS. 27 to 29. FIG. 27 is a flow chart of the method for transmitting a photographed image. FIG. 28 is a view of the photographing data. FIG. 29 is an explanatory view of the method for transmitting a photographed image.

As the method for transmitting a photographed image, it is possible that an image is stored as an image file in a bitmap, in GIF or others when photographed, and the image file itself is transmitted.

However, generally image files have large sizes, and disadvantageously require a number of packets and much time to be transmitted. Disadvantageously, for receivers to display the image files, the users who are the receivers require programs for displaying the image files.

In the photographed image transmitting method according to the present embodiment, in place of transmitting image files, information necessary for forming images is transmitted, and the receivers form the images, based on the information. In this method, sizes of the data to be transmitted are small and can be transmitted in short periods of time. Images are formed by the receivers, which makes it unnecessary to depend on storing methods of the image files.

The user A operates the information processing system 10 to photograph (Step S140), obtains a photographed image (Step S141) and displays the photographed image (Step S142). The photographed image is outputted in an image file (Step S143).

Then, For the transmission of the photographed image to the user B, the photographing data of the photographed image, is prepared. As shown in FIG. 28, the photographing data includes an initiation code 102, the ID code of the information processing system of a transmitter, the ID code 106 of the information processing system 10 of a receiver, photographing information 108, and an end code 110. The photographing information 108 includes a photographing time, a camera position, viewpoint position, photographed image angle, etc. The camera position and the viewpoint position are represented by XYZ coordinates in the game space.

The server 50 receives the photographing data (Step S146). The server 50, who has received the photographing data, identifies based on the photographing data whether or not the ID of the transmitter information processing system 10 with the ID of the receiver information processing system 10 (Step S147). The photographing data is transmitted to the receiver information processing system 10 via the network 90 (Step S148).

The information processing system 10 of the user B receives the photographing data (Step S140). The information processing system 10, who received the photographing data, makes a photographed image, based on the photographing information 108 in the photographing data 100 (Step S150), displays the prepared image (Step S151) and outputs the prepared image as an image file (Step S152).

The photographing data includes a photographed stage, a user position, a photographed position and direction, etc., whereby even when time has passed from photographing, and the information processing systems 10 are not connected on line, a photographed image can be prepared.

It is possible that when photographed, a lightest packet alone (e.g., information of having photographed) is transmitted while the photographing data, such as position information, etc., being stored in a memory, and when the image is made, the photographing data is transmitted and reproduced.

Modifications

The present invention is not limited to the above-described embodiment and can cover other various modifications. For example, the present invention is applied to the network system of domestic game apparatuses as the information processing systems of the above-described embodiment. However, the present invention is applicable to network systems of terminal devices installed in stores, such as game centers, game cafes, etc., portable game apparatuses, electronic devices, such as personal computers, etc. in houses, portable telephones, portable terminals, such as PHS, PDA, etc., and others.

What is claimed is:

1. A control method of an information processing device in a network system to which a plurality of information processing devices are connected, said plurality of information processing devices placing a plurality of characters that respectively correspond to said plurality of information processing devices to a first virtual space shared by said plurality of information processing devices, said plurality of characters being freely movable in accordance with operated inputs of said plurality of information processing devices, said control method being executed by a control means of said information processing device and comprising:

a step of designating a distance from one character placed in said first virtual space to specify at least one character placed within said distance;

a step of creating a second virtual space based upon said distance when specifying said at least one character;

a step of placing said at least one character in said second virtual space;

a step of photographing an image of said at least one character seen from a virtual viewpoint corresponding to said information processing device in said second virtual space in accordance with an operated input of said information processing device;

a step of generating a photographing data including information of said image after photographing, which is executed by said control means of said information processing device; and a step of transmitting said photographing data to the other information processing devices, which is executed by said control means of said information processing device, wherein:

the photographing data includes at least one ID code identifying said information processing device corresponding to said at least one character among said plurality of the information processing devices, an ID code identifying said information processing device photographing said image, and photographing information including information of said virtual viewpoint when photographing, and said photographing information includes a coordinate information of said virtual viewpoint in said second virtual space and a coordinate information of a viewpoint position of said virtual viewpoint in said second virtual space.

2. An information processing device in a network system to which a plurality of information processing devices are connected, said plurality of information processing devices placing a plurality of characters which respectively correspond to said plurality of information processing devices to a first virtual space shared by said plurality of information processing devices, said plurality of characters being freely movable in accordance with operated inputs of said plurality of information processing devices, said information processing device comprising a control means for executing:

a step of designating a distance from one character placed in said first virtual space to specify at least one character placed within said distance;

a step of creating a second virtual space based upon said distance when specifying said at least one character; a step of placing said at least one character in said second virtual space;

a step of photographing an image of said at least one character seen from a virtual viewpoint corresponding to said information processing device in said second virtual space in accordance with an operated input of said information processing device;

a step of generating a photographing data including information of said image after photographing; and a step of transmitting said photographing data to the other information processing devices, wherein:

the photographing data includes at least one ID code identifying said information processing device corresponding to said at least one character among said plurality of the information processing devices, an ID code identifying said information processing device photographing said image, and photographing information including information of said virtual viewpoint when photographing, and said photographing information includes a coordinate information of said virtual viewpoint in said second virtual space and a coordinate information of a viewpoint position of said virtual viewpoint in said second virtual space.

3. An information storage medium storing a control program for an information processing device in a network system to which a plurality of information processing devices are connected, said plurality of information processing devices placing a plurality of characters which respectively correspond to said plurality of information processing devices to a first virtual space shared by said plurality of information processing devices, said plurality of characters being freely movable in accordance with operated inputs of said plurality of information processing devices, said control program when executed by a control means of said information processing device causes the control means to execute:

- a step of designating a distance from one character placed in said first virtual space to specify at least one character placed within said distance, which is executed by a control means of said information processing device;
- a step of creating a second virtual space based upon said distance when specifying said at least one character, which is executed by said control means of said information processing device;
- a step of placing said at least one character in said second virtual space, which is executed by said control means of said information processing device;
- a step of photographing an image of said at least one character seen from a virtual viewpoint corresponding to said information processing device in said second virtual space in accordance with an operated input of said information processing device, which is executed by said control means of said information processing device;
- a step of generating a photographing data including information of said image after photographing, which is executed by said control means of said information processing device; and a step of transmitting said photographing data to the other information processing devices, which is executed by said control means of said information processing device, wherein: the photographing data includes at least one ID code identifying said information processing device corresponding to said at least one character among said plurality of the information processing devices, an ID code identifying said information processing device photographing said image, and photographing information including information of said virtual viewpoint when photographing, and said photographing information includes a coordinate information of said virtual viewpoint in said second virtual space and a coordinate information of a viewpoint position of said virtual viewpoint in said second virtual space.

* * * * *

UNITED STATES PATENT AND TRADEMARK OFFICE
CERTIFICATE OF CORRECTION

PATENT NO. : 7,620,686 B2  Page 1 of 1
APPLICATION NO. : 10/635643
DATED : November 17, 2009
INVENTOR(S) : Morimoto et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1867 days.

Signed and Sealed this

Twenty-sixth Day of October, 2010

David J. Kappos
*Director of the United States Patent and Trademark Office*